(12) United States Patent
McLaughlin

(10) Patent No.: US 11,010,806 B2
(45) Date of Patent: May 18, 2021

(54) METHOD AND SYSTEM FOR DISTRIBUTED MANUFACTURING

(71) Applicant: Gerald McLaughlin, Las Vegas, NV (US)

(72) Inventor: Gerald McLaughlin, Las Vegas, NV (US)

( * ) Notice: Subject to any disclaimer, the term of this patent is extended or adjusted under 35 U.S.C. 154(b) by 432 days.

(21) Appl. No.: 15/348,833

(22) Filed: Nov. 10, 2016

(65) Prior Publication Data

US 2018/0130111 A1 May 10, 2018

(51) Int. Cl.
*G06Q 30/06* (2012.01)
*G05B 19/418* (2006.01)

(52) U.S. Cl.
CPC ..... *G06Q 30/0621* (2013.01); *G06Q 30/0623* (2013.01); *G05B 19/41865* (2013.01); *G05B 2219/31415* (2013.01)

(58) Field of Classification Search
CPC .................. G06Q 30/0621; G06Q 30/0623
See application file for complete search history.

(56) References Cited

U.S. PATENT DOCUMENTS

| | | |
|---|---|---|
| 5,426,594 A | 6/1995 | Wright et al. |
| 5,748,484 A | 5/1998 | Cannon et al. |
| 6,958,014 B1 | 10/2005 | Luciano, Jr. et al. ......... 463/17 |
| 7,625,279 B1 | 12/2009 | Luciano, Jr. et al. ......... 463/17 |
| 7,758,413 B2 | 7/2010 | Luciano, Jr. et al. ......... 463/17 |
| 8,156,115 B1 | 4/2012 | Erol et al. |
| 8,340,291 B2 | 12/2012 | Wanderley |

(Continued)

FOREIGN PATENT DOCUMENTS

| | | |
|---|---|---|
| CN | 104780214 A | 7/2015 |
| EP | 0784394 | 7/1997 |

(Continued)

OTHER PUBLICATIONS

Anonymous: "Distributed Manufacturing—Wikipedia," Nov. 2016, URL: https://en.wikipedia.org/w/index.php?title=Distributed_manufacturing&oldid=747488112, 2 pgs.

(Continued)

*Primary Examiner* — Chad G Erdman
(74) *Attorney, Agent, or Firm* — Campbell Stephenson LLP

(57) ABSTRACT

A method, computer program product, and system are disclosed. The method, when implemented in a computer system, includes obtaining product information, selecting a production node from a plurality of production nodes, and communicating production information to the production node. The product information is configured to facilitate production of a product. The selecting performed by the computer system comprises determining a physical location of a destination of the product and identifying the production node. The identifying is based, at least in part, on the physical location and one or more production criteria. The production information comprises information identifying the product. The computer system is configured to communicate with each production node of the plurality of production nodes. The communicating is configured to result in production of the product by the production node.

22 Claims, 25 Drawing Sheets

(56) References Cited

U.S. PATENT DOCUMENTS

| | | | |
|---|---|---|---|
| 8,449,373 B2 | 5/2013 | Luciano, Jr. et al. | 463/17 |
| 8,462,371 B1* | 6/2013 | Uhlig | G06F 40/174 |
| | | | 358/1.15 |
| 8,515,826 B2 | 8/2013 | Norman | 705/26.5 |
| 8,529,330 B2 | 9/2013 | Luciano, Jr. et al. | 463/17 |
| 8,775,245 B2 | 7/2014 | Christie et al. | |
| 8,782,159 B2 | 7/2014 | Shiigi | |
| 8,812,497 B2 | 8/2014 | Mayle et al. | |
| 10,275,189 B2* | 4/2019 | LaVigne | G06F 3/1203 |
| 2002/0090240 A1 | 7/2002 | Lively | |
| 2005/0174605 A1* | 8/2005 | Silverbrook | G06Q 20/3821 |
| | | | 358/1.18 |
| 2005/0264832 A1 | 12/2005 | Baum et al. | |
| 2008/0180729 A1* | 7/2008 | LaVigne | G06F 3/1203 |
| | | | 358/1.15 |
| 2008/0184287 A1 | 7/2008 | Lipscomb | |
| 2009/0069929 A1 | 3/2009 | Nguyen et al. | |
| 2011/0026042 A1 | 2/2011 | Cogan et al. | |
| 2011/0134441 A1* | 6/2011 | Barker | G06F 3/1205 |
| | | | 358/1.1 |
| 2011/0145342 A1 | 6/2011 | Berger et al. | |
| 2011/0222087 A1 | 9/2011 | Gelphman | |
| 2012/0011214 A1 | 1/2012 | Silverbrook | |
| 2012/0066613 A1 | 3/2012 | Berger | |
| 2012/0307267 A1 | 12/2012 | Blanchard et al. | |
| 2013/0042509 A1 | 2/2013 | Hawkins et al. | |
| 2014/0108188 A1 | 4/2014 | Comstock et al. | |
| 2014/0201624 A1 | 7/2014 | Clark et al. | |
| 2015/0199755 A1 | 7/2015 | Friedman | G06Q 30/08 |
| 2016/0086254 A1 | 3/2016 | Tapley et al. | G06Q 30/0635 |
| 2017/0019566 A1 | 1/2017 | Nithianand et al. | |
| 2017/0173889 A1* | 6/2017 | Thomas-Lepore | |
| | | | G05B 19/4099 |
| 2017/0262446 A1 | 9/2017 | McLaughlin | |

FOREIGN PATENT DOCUMENTS

| | | |
|---|---|---|
| GB | 2493765 | 2/2013 |
| WO | WO 00/63820 | 10/2000 |
| WO | WO 01/29794 | 4/2001 |

OTHER PUBLICATIONS

Search Report issued in UK Patent Applicaion No. GB1114252.8 dated Nov. 19, 2012.

Third Party Observation issued in UK Patent Application No. GB1114252.8 dated Oct. 16, 2013.

* cited by examiner

METHOD AND SYSTEM FOR DISTRIBUTED MANUFACTURING

FIELD OF THE INVENTION

The present invention relates to the manufacture of products, and, more particularly, to methods and systems for the distributed manufacturing of such products.

BACKGROUND

Computers have become an integral part of the daily lives of millions of individuals across the globe. Consumers use computers in their various forms, be they desktop computers, tablets, smartphones, or the like, to all manner of ends. One such purpose is the buying and selling of physical products. The use of computers in the buying and selling of physical products provides consumers with a wide array of such products from which to choose. However, such items are often produced and distributed from a central location. In such scenarios, such items often are produced at significant distances from the ultimate intended recipient, and often, even from the intermediate point through which distribution occurs. Generally, the greater such distances, naturally, the greater the time needed to deliver the item, as well as the associated delivery costs, among other such disadvantages.

Efforts to minimize delivery times and cost often focus on improvements in the distribution pathway between manufacturer and relevant end-point, such as a retail store or the consumer. These improvements often revolve around new handling equipment, improved transportation means, or changes in the use of intermediate distribution points.

Complicating matters is the fact that a customer may wish to personalize the item purchased. This may take the form of penning a sentiment in a greeting card, choosing a made-to-order style or color, adding or deleting options, or the like. If such items are personalized at the point of manufacture, such items cannot be pre-positioned in advance closer to the end-point in order to reduce delivery times and costs.

The foregoing problems, as well as other such failings, stand as obstacles to the efficient, effective manufacture and distribution of physical items. That being the case, it is therefore desirable to provide mechanisms that address such shortcomings, and to do so in an effective, efficient manner.

BRIEF DESCRIPTION OF THE DRAWINGS

The present invention may be better understood, and its numerous objects, features and advantages made apparent to those skilled in the art by referencing the accompanying drawings.

DETAILED DESCRIPTION

Figure 1:
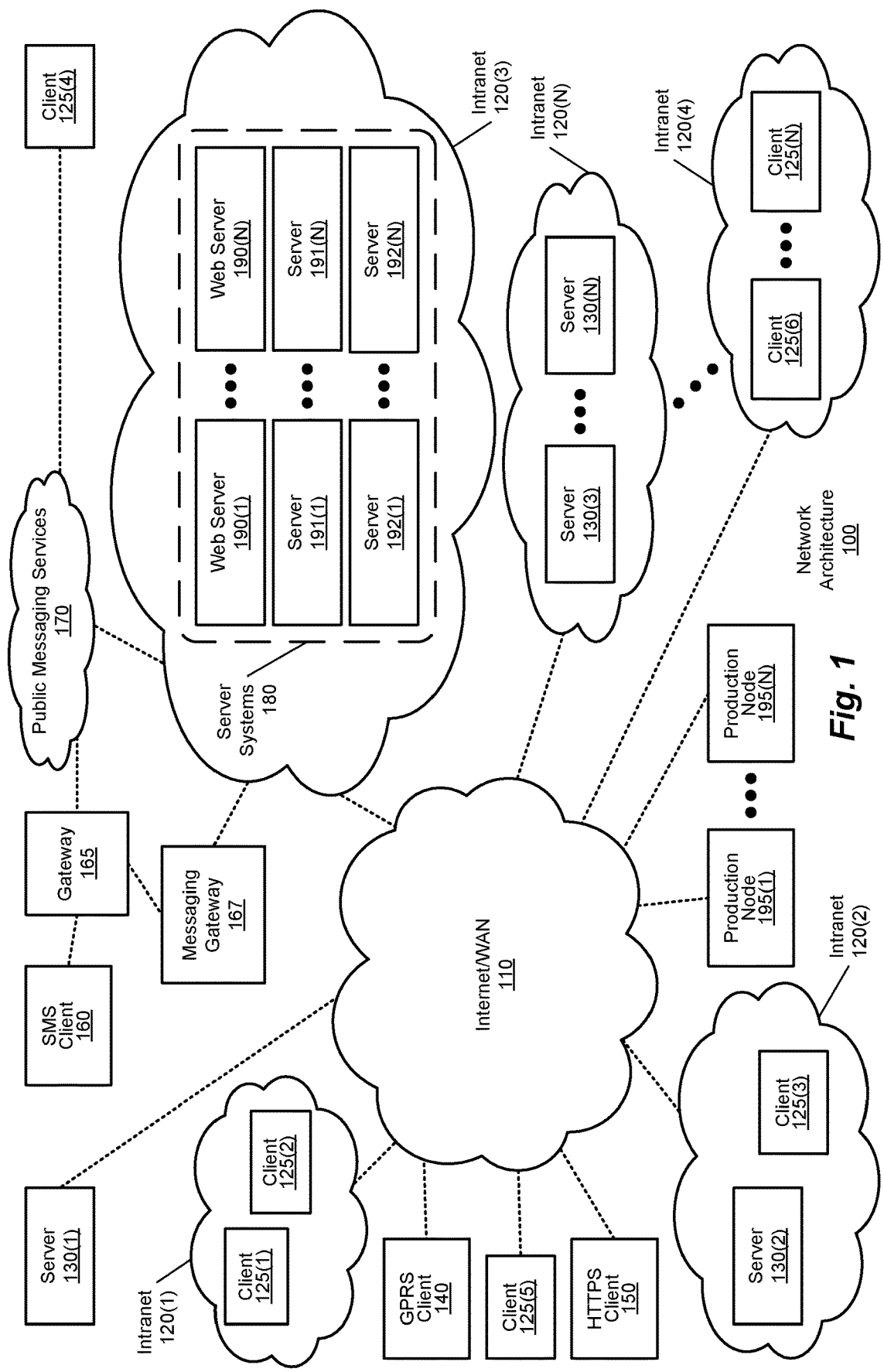
FIG. 1 is a block diagram illustrating an example of a network architecture, according to methods and systems such as those disclosed herein.

The following is intended to provide a detailed description of an example of the invention and should not be taken to be limiting of the invention itself. Rather, any number of variations may fall within the scope of the invention which is defined in the claims following the detailed description.

Introduction

Methods and systems such as those described herein provide the ability to produce physical items by way of various components of a distributed manufacturing system. Products and features thereof are defined/created by users employing feature creation clients, which interact with one or more central or distributed servers/server systems. Such products and features can then be customized by users employing customization clients (e.g., a customer personalizing a gift according to such embodiments). Such features, if available for customization, can comprehend any aspect of a given product, and so can include, by way of example, the addition of a written sentiment, audio information, size, shape, functional features, color, optional feature(s), and/or other such attributes. As is also discussed subsequently, modifications to such products (e.g., the addition or removal of one or more features to/from a product, in the manner of feature creation) can also be effected during (in addition to or instead of) customization of the product. The product/features in question, having been created and customized, can then be produced at a point of production (POP) identified and selected as per the processes described subsequently herein.

To this end, the distributed manufacture (also referred to herein as production) of such physical items (also referred to herein as products) is made possible through the description of such products using digital information. Such digital information is used to represent/describe the product(s) to be produced, the various features of such product(s), and customizations of such products and their features. Through the use of such digital information, a distributed manufacturing system according to methods and systems such as those described herein operates in a distributed manner, and thereby is capable of producing the desired products at one or more points of production (POPs) that are situated in certain location(s) remote from (or at least, separate from) the location of users (whether users who define such products/features or those who customize such products/features) and/or systems (e.g., servers) that facilitate such interaction and production. Such separation can be physical, logical, logistical, or by some other measure.

Thus, by providing the ability to control the location at which a given product is produced, a distributed manufacturing system according to methods and systems such as those described herein is able to manage the shipping and delivery of such products. For example, by locating POPs in or near certain geographic locations, such products can be produced and/or shipped/delivered advantageously. In this regard, considerations affecting such identification and selection can include, but are not limited to, factors such as shipping/delivery time needed for receipt by a recipient of the product (optionally including the time needed for a particular POP to produce the product), cost associated therewith, environmental factors (e.g., a product's "carbon footprint"), various capabilities of the various POPs (e.g., whether a particular POP possesses the requisite mechanisms to produce the desired product with the desired customizations), and other such considerations. In addition to facilitating the management of production, shipping, and delivery of such products, such a distributed manufacturing system, given its distributed nature, also provides facilities for the selection of one or more POPs, to effect the production of such products at one or more corresponding points-of-service (POSs), with attendant advantages. For example, the ability to identify and select a particular POP based on that POP's location at a certain POS provides a number of advantages, including the ability to identify/select backup POPs based on their corresponding POSs (e.g., in the case of a failure in the primary POP or communication thereto), selection of a POP by POS in conjunction with other commercial activity (e.g., selection of a POP at a POS from which other items are being shipped), and other advantages that the distributed nature of a system such as those described herein is able to provide.

Thus, among other advantages, methods and systems such as those described herein reduce the required shipping times and handling activity on finished goods. By producing the goods as logistically close to the end-point as possible, the time and cost of shipping and handling such items is reduced. This forward-staging of the raw materials allows such methods and systems to reduce overall inventory requirements because the raw materials available at a given POP can become any product producible from those raw materials. So, for example, having one piece of blank card stock is in a sense the same as having one each of every possible greeting card.

Example Network Architecture

FIG. 1 is a block diagram illustrating an example of a network architecture 100 that includes server systems and other components, according to one embodiment. Network architecture 100 includes an internetwork (depicted in FIG. 1 as an internet/wide area network (WAN) 110), which is configured to couple a number of intranets to one another (depicted in FIG. 1 as intranets 120(1)-(N)). Intranets 120(1)-(N), in turn, can include a number of components, such as one or more clients (depicted in FIG. 1 as clients 125(1)-(N)) and/or servers (depicted in FIG. 1 as servers 130(1)-(N)). Clients 125(1)-(N) and/or servers 130(1)-(N) can, for example, be implemented using computer systems such as those described in connection with FIGS. 18 and 19. Internet/WAN 110 thus communicatively couples intranets 120(1)-(N) to one another, thereby allowing clients 125(1)-(N) and servers 130(1)-(N) to communicate with one another (and can, in certain embodiments, provide for the servers of intranets 120(3) and 120(N), for example, to operate as cloud-based server systems). As is depicted in FIG. 1, clients 125(1)-(N) can be communicatively coupled to one another and to servers 130(1)-(N) as part of one of intranets 120(1)-(N), or directly via internet/WAN 110. Similarly, servers 130(1)-(N) can be coupled via intranet/WAN 110 via a direct connection to intranet/WAN 110, or as part of one of intranets 120(1)-(N).

Network architecture 100 also provides for communication via intranet/WAN 110 using one or more other devices. Such devices can include, for example, a general packet radio service (GPRS) client 140 (e.g., a "smart phone," a "tablet" computer, or other such mobile device), a secure web client (depicted in FIG. 1 as a secure hypertext transfer protocol client 150), and a basic cellular phone (e.g., using standard texting or other communication protocols, and depicted in FIG. 1 as a simple messaging service (SMS) client 160). HTTPS client 150 can be, for example, a laptop computer using the HTTP Secure (HTTPS) protocol. Support for GPRS clients, SMS clients, HTTP clients, and the like thereby provide users with communication functionality according to an embodiment in a mobile environment. As is also depicted in FIG. 1, SMS client 160 can communicate via internet/WAN 110 via several channels. SMS client 160 can communicate directly, for example, with a gateway 165, which, in turn, communicates with internet/WAN 110 via a messaging gateway 167 and, optionally, elements within intranet 120(3), for example. Alternatively, SMS client 160 can, via gateway 165, communicate with intranet 120(3) (and so, internet/WAN 110) via public messaging services 170 to which gateway 165 and intranet 120(3) are connected. As is also depicted in FIG. 1, a client 125(4) is also able to communicate via internet/WAN 110 by way of public communication services 170 and intranet 120(3). In order to support such communications, as well as other communications according to various embodiments, intranet 120(3) includes server systems 180, as well as (optionally) providing for a number of clients (not shown), in the manner of intranet 120(2).

Server systems 180 include a number of components that allow server systems 180 to provide various functionalities (e.g., supporting various communications, web-based services, cloud-based services, enterprise services, and so on). Among these components, in certain embodiments, are a number of servers, which can be implemented in hardware and/or software. Examples of such servers include web servers (depicted in FIG. 1 as web servers 190(1)-(N), servers 191(1)-(N)), and servers 192(1)-(N). As will be appreciated in light of the present disclosure, servers 191(1)-(N) and servers 192(1)-(N) are merely (and only generically) representative of servers and their configurations that can be employed in the implementation of methods and systems such as those disclosed herein. Further in this regard, while server systems 180 are depicted, at least to some extent, as being centrally located (or at least, co-located), such is the case simply for ease of presentation. As will be appreciated in light of the present disclosure, server systems 180 can themselves be implemented in a distributed manner.

Servers such as those included in server systems 180 comprehend hardware and/or software configured to facilitate functionalities that support operations according to the concepts disclosed herein, among other possible such components and mechanisms, in communication with one another (e.g., directly, via various application programming interfaces (APIs) and/or other such interfaces, and/or other such mechanisms and/or constructs). As will be discussed in greater detail in connection with subsequent figures, the server systems of server systems 180 provide such functionality, for example by presenting end-users with a website (functionality effected by, for example, web servers 190(1)-(N)). In so doing, web servers 190(1)-(N) present information collected, generated, organized, and maintained by one or more servers 191(1)-(N) and/or servers 192(1)-(N). Such a website can be accessed by an end-user using a client computing device such as one or more of clients 125(1)-(N), GPRS client 140, HTTPS client 150, and/or SMS client 160. As will be appreciated in light of the present disclosure, the ability to support such functionality on mobile devices such as those described herein is of importance, as mobile electronic commerce is fast becoming an important facet of today's online environment. In providing functionality such as that described herein, network architecture 100 is able to support the identification and presentation of relevant product/service information in an efficient, effective manner.

To this end, a number of production nodes (depicted in FIG. 1 as production nodes 195(1)-(N), and also referred to herein as points-of-production (POPs)) are also provided as part of network architecture 100. Production nodes 195(1)-(N) provide mechanisms, as well as hardware and software, capable of performing one or more production operations, and in so doing, produce the desired product(s). Further, production nodes 195(1)-(N) can provide functionality that supports the production of customized versions of such products. As discussed subsequently, such customizations can be implemented as changes to various features, selection(s) of various options, and the like. Modifications (e.g., the addition or deletion of one or more features to/from a product, in the manner of feature creation) can also be implemented as part of the customization process.

It will be appreciated that, in light of the present disclosure, the variable identifier "N" is used in several instances in various of the figures herein to more simply designate the final element of a series of related or similar elements (e.g., intranets 120(1)-(N), clients 125(1)-(N), and servers 130(1)-(N)). The repeated use of such variable identifiers is not meant to imply a correlation between the sizes of such series of elements. The use of variable identifiers of this sort in no way is intended to (and does not) require that each series of elements have the same number of elements as another series delimited by the same variable identifier. Rather, in each instance of use, variables thus identified may represent the same or a different value than other instances of the same variable identifier.

As will be appreciated in light of the present disclosure, processes according to concepts embodied by systems such as those described herein include one or more operations, which may be performed in any appropriate order. It is appreciated that operations discussed herein may consist of directly entered commands by a computer system user or by steps executed by application specific hardware modules, but the preferred embodiment includes steps executed by software modules. The functionality of steps referred to herein may correspond to the functionality of modules or portions of modules.

The operations referred to herein may be modules or portions of modules (e.g., software, firmware or hardware modules). For example, although the described embodiment includes software modules and/or includes manually entered user commands, the various example modules may be application specific hardware modules. The software modules discussed herein may include script, batch or other executable files, or combinations and/or portions of such files. The software modules may include a computer program or subroutines thereof encoded on computer-readable storage media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize that the operations described in example embodiment are for illustration only. Operations may be combined or the functionality of the operations may be distributed in additional operations in accordance with the invention.

Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of the flow diagram may be executed by a module (e.g., a software module) or a portion of a module, or a computer system user using, for example, a computer system such as computer system 1810, described subsequently in connection with FIG. 18. Thus, the above described method, the operations thereof and modules therefor may be executed on a computer system configured to execute the operations of the method and/or may be executed from computer-readable storage media. The method may be embodied in a machine-readable and/or computer-readable storage medium for configuring a computer system to execute the method. Thus, the software modules may be stored within and/or transmitted to a computer system memory to configure the computer system to perform the functions of the module, for example.

Such a computer system normally processes information according to a program (a list of internally stored instructions such as a particular application program and/or an operating system) and produces resultant output information via I/O devices. A computer process typically includes an executing (running) program or portion of a program, current program values and state information, and the resources used by the operating system to manage the execution of the process. A parent process may spawn other child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Such a computer system typically includes multiple computer processes executing "concurrently." Often, a computer system includes a single processing unit that is capable of supporting many active processes alternately. Although multiple processes may appear to be executing concurrently, at any given point in time only one process is actually executed by the single processing unit. By rapidly switching which process is being executed, a computer system gives the appearance of concurrent process execution. The ability of a computer system to multiplex the computer system's resources among multiple processes in various stages of execution is called multitasking. Systems with multiple processing units, which by definition can support true concurrent processing, are called multiprocessing systems. Active processes are often referred to as executing concurrently when such processes are executed in a multitasking and/or a multiprocessing environment.

The software modules described herein may be received by such a computer system, for example, from computer readable storage media. The computer readable storage media may be permanently, removably, or remotely coupled to the computer system. The computer readable storage media may non-exclusively include, for example, any number of the following: magnetic storage media including disk and tape storage media, optical storage media such as compact disk media (e.g., CD-ROM, CD-R, etc.) and digital video disk storage media, nonvolatile memory storage memory including semiconductor-based memory units such as FLASH memory, EEPROM, EPROM, ROM or application specific integrated circuits; volatile storage media including registers, buffers or caches, main memory, RAM, and the like; and other such computer-readable storage media. In a UNIX-based embodiment, the software modules may be embodied in a file, which may be a device, a terminal, a local or remote file, or other such devices. Other new and various types of computer-readable storage media may be used to store the software modules discussed herein.

Example Architectures for a Distributed Manufacturing System

Figure 2:
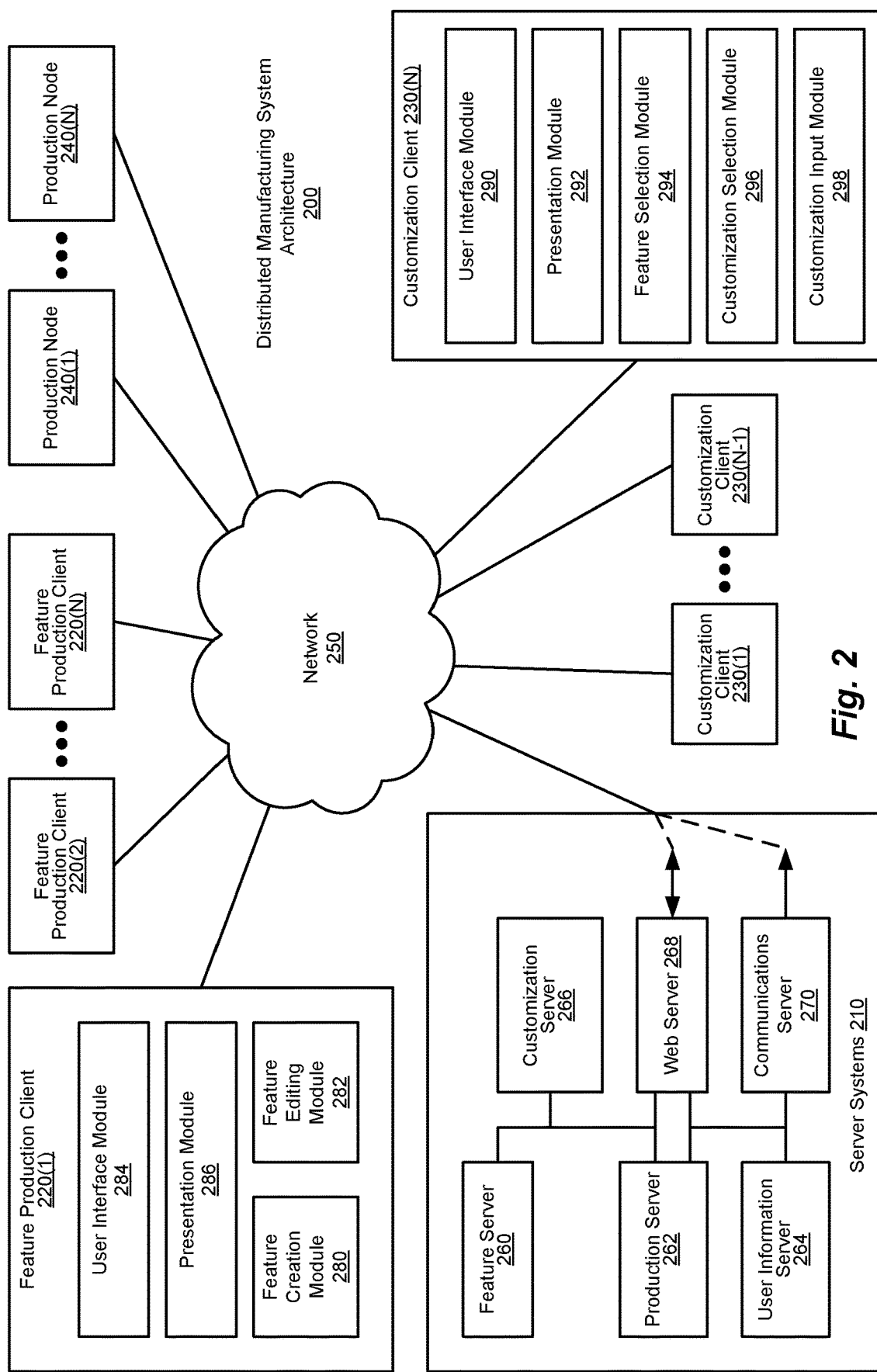
FIG. 2 is a block diagram illustrating an example of a distributed manufacturing system architecture, according to methods and systems such as those disclosed herein.

FIG. 2 is a block diagram illustrating an example of a distributed manufacturing system architecture, according to methods and systems such as those disclosed herein. To this end, FIG. 2 depicts a distributed manufacturing system architecture 200. Distributed manufacturing system architecture 200 includes a number of server systems (depicted in FIG. 2 as server systems 210), which are, in certain embodiments, comparable in various aspects to one or more of the servers of server systems 180 of FIG. 1. Also included in distributed manufacturing system architecture 200 are a number of feature production clients (depicted in FIG. 2 as feature production clients 220(1)-(N)) and a number of customization clients (depicted in FIG. 2 as customization clients 230(1)-(N)). Further, distributed manufacturing system architecture 200 also includes a number of production nodes (depicted in FIG. 2 as production nodes 240(1)-(N)).

Server systems 210, feature production clients 220, customization clients 230, and production nodes 240 (points-of-production, or POPs) are communicatively coupled to one another via a network 250 (e.g., a wide area network such as the Internet). In turn, server systems 210 include a number of servers that provide a variety of functions in support of the facilities provided by distributed manufacturing system architecture 200. In one embodiment, such servers include a feature server 260, a production server 262, a user information server 264, a customization server 266, a web server 268, and a communications server 270. As will be appreciated in light of the present disclosure, and more specifically, with regard to the descriptions of the methods and systems presented herein, one or more features of a given product are provided by one or more of feature production clients 220, the results of which are maintained by feature server 260. Similarly, such features (as well as products generally) can be customized by way of customization clients 230. Customization clients 230 interact with customization server 266 in order to effect customization of such products and/or their respective features/feature sets. Interactions between feature production clients 220 and customization clients 230 with their respective servers of server systems 210 are, in certain embodiments, effected via network 250 and web server 268. For example, users of feature production clients 220 can access feature server 260 via web server 268, while users of customization clients 230 can access customization server 266 via web server 268. Users of customization clients 230 can also access production server 262 and user information server 264 via web server 268, and are thereby able to not only customize products and features thereof, but also direct production of such customized products. To this end, production server 262 interacts with communications server 270, in order to identify the appropriate one(s) of production nodes 240, and communicate the relevant digital information thereto. In this regard, users of customization clients 230 can also access user information server 264 via web server 268, in order to provide their information, recipient information, billing information, and other information relevant to the production and delivery of the desired product(s). Such information is then available for use by communications server 270 in identifying and selecting one or more of production nodes 240.

In light of the foregoing, the communication paths between various servers are depicted in FIG. 2 as supporting communications between ones of feature production clients 220 and web server 268, and ones of customization clients 230 and web server 268. Web server 268, in turn, is depicted as being in communication with two groups of servers. The first of these groups is feature server 260, customization server 266, and production server 262, and web server 268 is configured to support communications between these servers and feature production clients 220/customization clients 230. Web server 268 also provides for communications between ones of customization clients 230 and various production-oriented servers, including, for example, production server 262, user information server 264, and communications server 270. As will be appreciated in light of the present disclosure, while such communications paths are depicted in the foregoing manner, such an architecture is merely an example of such communications paths. Any number of alternatives are possible in this regard, and are intended to come within the scope of the present disclosure.

Feature production clients such as feature production clients 220 (e.g., feature production client 220(1)) include a number of modules supporting such functionality. For example, feature production client 220(1) is depicted in FIG. 2 as including a feature creation module 280 and a feature editing module 282. A user of feature production client 220(1) is provided access to feature creation module 280 and feature editing module 282, among other such modules, via a user interface module 284 and a presentation module 286. As will be appreciated in light of the present disclosure, user interface module 284 allows a user thereof (via web server 268) to avail themselves of the functionality provided by feature creation module 280 and feature editing module 282, and so create and edit products and features thereof by way of creating and editing the digital information used to produce such products.

Similarly, a customization client such as one of customization clients 230 can be used to make modifications, additions, deletions, changes, and other such customizations to the product or products being produced by allowing a user of such a customization client to make modifications, additions, deletions, changes, and other customizations to the digital information used in the production of such products. For example, a customization client such a customization client 230(N) facilitates such customization through the provision of a number of modules providing such functionality. Thus, as depicted in FIG. 2, customization client 230(N) includes a user interface module 290, a presentation module 292, a feature selection module 294, a customization selection module 296, and a customization input module 298, among other such possible components.

Similar to feature production clients 220, customization client 230(N) provides user interface module 290 and presentation module 292 to allow a user to interact with the digital information that will be used to produce the product in question, as well as, in the case of customization client 230(N), customization of the product. Also as before, user interface module 290 and presentation module 292 facilitate such interactions, for example, by supporting communications with customization server 266 (in customizing a product and/or features thereof), as well as production server 262, user information server 264, and communications server 270 in the production thereof, via network 250 and web server 268. In addition to facilitating such interactions, user interface module 290 and presentation module 292 also support the acquisition of information regarding, for example, user information, sender information for the shipping/delivery of the product(s) (i.e., information regarding the party requesting shipping/delivery of the product(s)), recipient information, and the like.

As will be appreciated in light of the present disclosure, a given product may have a number of features that a user may wish to include or exclude. To this end, customization client 230(N) includes feature selection module 294, which provides a mechanism by which a user is able to include, exclude, or modify a given feature of the product to be produced. Beyond simple inclusion/exclusion of a given feature that a given product may be configured to include or exclude, feature selection module 294 can also support the addition of new features to the product to be produced. Similarly, a variety of customizations may be available for a given product, and customization selection module 296 allows a user to include or exclude such customizations with or from the product to be produced. In addition to allowing a user to select predefined features and customizations for inclusion or exclusion, customization client 230(N) also supports the direct input of customizations for the product in question via customization input module 298.

As will also be appreciated in light of the present disclosure, advantages of providing the user with the ability to select a product and the features thereof include the simplification of the customization process. Products, as well as features to be included/excluded, can be identified using any convenient mechanism. For example, products and their features can be identified by an assigned numerical value, a hash value (e.g., by hashing information regarding the product or feature), and/or other such identifying information. As will also be appreciated in light of the present disclosure, the use of a hashing function to generate such identifiers provides an efficient mechanism for communicating, storing, searching, and otherwise processing information such as that described herein.

In a manner comparable to that of interactions between feature production clients 220 and feature server 260, customization clients 230 interact with customization server 266 via network 250 (as well as web server 268, for example). In so doing, customization clients 230 retrieve digital information regarding the product or products to be produced from one of more of server systems 210, facilitate the requisite customizations to that digital information (and so, to the product or products being produced), and return the customized digital information to the appropriate servers (e.g., customization server 266). Further in support of this process, user information server 264 can maintain digital information such as user information, recipient information, preferences, customization rights, account information, and the like, for use by one or more of the other server systems of server systems 210.

Aggregating and integrating the aforementioned digital information from, for example, feature server 260 and customization server 266, among other sources, production server 262 provides support to production nodes 240 in the production of the products in question. Further in support of this process, communication server 270 acts to make determinations with regard to which of production nodes 240 are to produce the product or products in question and convey the requisite digital information to the selected ones of production nodes 240, in order to effect the production of the product or products in question. The operation of the servers of server systems 210 are provided in connection with FIGS. 3-7, below.

In view of the foregoing and as noted elsewhere herein, it will be appreciated that various ones of feature server 260, production server 262, user information server 264, customization server 266, web server 268, and communications server 270, and/or other servers of server systems 210 (not shown), can be combined in various ways, as may be desired, and are simply shown as separate servers to simplify the description of such functions. Such is also the case for various ones of feature production clients 220 and/or customization clients 230, the functions of which can be combined in various ways to provide such functionalities in various clients.

As an example of the foregoing mechanisms, the product to be produced (e.g., by way of a POP providing three-dimensional printing, painting, and/or robotic assembly capabilities) might be, for example, a chair, which might be configurable to allow a customer to select the number of legs for the chair, whether the chair has arms or not, and the style of the chair's seatback. In such a scenario, the customer can use feature selection module 294 to select the number of legs for the chair, and that the chair should have arms, by way of user interface module 290 and presentation module 292. Further, the customer can use feature selection module 294 to add features (e.g., by way of modifying the basic description of the product, in the manner of a feature production client such as one of feature production clients 220). In the present example, a customer might decide, for example, to add a headrest to the seatback. In so doing, the customer creates the headrest by modifying the digital information defining the chair (e.g., by adding the requisite information for the headrest to the product's design (e.g., in AUTOCAD, 3D MANUFACTURING FORMAT (3MF), or other such computer-aided drafting format), in the manner of a user of a feature production client). Using customization selection module 296, the customer can also select the seatback style (such a chair, for purposes of this example, having a seatback and the seatback having a default style, with the selection or definition of a different style being a customization of the feature). Further in this regard, a customer can use customization input module 298 to make individualized customizations, such as determining the color, dimensions, and other such variable characteristics of the product. The product, as noted, can then be produced. Alternatively, as will be appreciated in light of the present disclosure, a customer can forego such activities, and use such a customization client simply to request production of the desired product. In so doing, the customer can, in one embodiment, select one (or more) products, and have them produced and shipped (or made available for delivery).

From a different perspective, distributed manufacturing system architecture 200 can be viewed as a POP management system, in which the production function (for each POP and as between POPs) is managed in order to improve efficiency and productivity, reduce or minimize delay in delivery, reduce or minimize risk (e.g., of failure in delivery), reduce cost, provide compliance with government regulations, and the like. As will be appreciated, each POP (whether distributed or centrally located) will consume supplies (e.g., paper, toner/ink, plastic/metal/other 3D printing material, paint or other coloring, and so on). Such consumption results in the need to replenish such materials, which will typically incur costs related to the delivery of such materials and the servicing of the POPs (which can, in fact, include mechanical servicing of the POP that may be needed at regular intervals (or in the case of failure)). Such activities can be performed more efficiently (e.g., coordinating the maintenance of POPs in a given area, knowing what materials are needed, and so on) when information regarding the state of each POP can be determined. Further, such a determination can also inform decisions as to which POP(s) is (are) best able to produce the item(s) in question. Further in this regard, as noted elsewhere herein, determinations as to the functions supported by a given POP, the POP's current workload, its relationship to other POPs (e.g., are other POPs co-located with or logistically close to the POP in question, thereby making possible the production of multiple products at a given POS or in a given shipping zone, for example), and other such considerations can be taken into account when selecting one or more POPs for production of the given product. Such a system also opens up the possibility of implementing multiple POPs at a given POS (or even a production center) and performing load-balancing as between those POPs, as well as managing maintenance activities for co-located POPs (e.g., by scheduling maintenance/replenishment of POPs physically close to one another). Thus, in managing POPs (e.g., production nodes 240), a distributed manufacturing system architecture such as distributed manufacturing system architecture 200 is able to manage POP workloads, system throughput, shipping schedules, and other variables, thereby improving the operation of the overall system, in terms of speed, efficiency, and the like. Such determinations and considerations can be taken into account by methods and systems such as those described herein.

Figure 3:
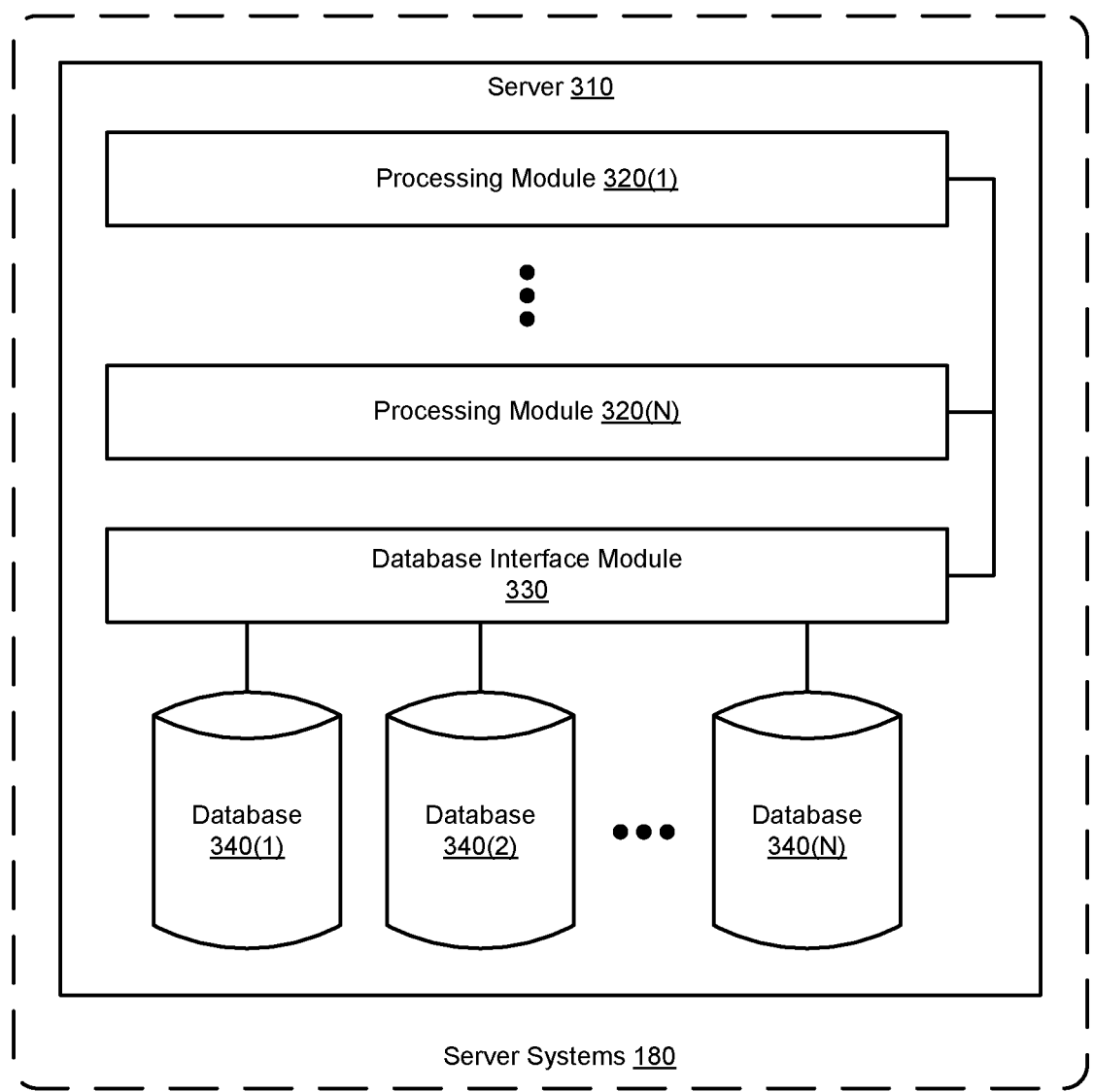
FIG. 3 is a block diagram illustrating an example of a generic server architecture, according to methods and systems such as those disclosed herein.

FIG. 3 is a block diagram illustrating an example of a generic server architecture, according to methods and systems such as those disclosed herein. FIG. 3 thus depicts a generic server architecture 300 that can be used to implement one or more of the server systems of server systems 180. A server of server systems 180 (depicted in FIG. 3 as a server 310) will thus include, typically, a number of components that support the maintenance and retrieval of digital information. For example, such components can include one or more processing modules (depicted in FIG. 3 as processing modules 320(1)-(N), a database interface module (depicted in FIG. 3 as a database interface module 330), and one or more databases (depicted in FIG. 3 as databases 340(1)-(N)). Generally, databases 340(1)-(N) store digital information pertinent to the processing performed by processing modules 320(1)-(N). Database interface module 330 provides one or more of processing modules 320(1)-(N) with access to databases 340(1)-(N). Additionally, database interface module 330 can provide other servers of the given server systems, as well as other components of the distributed manufacturing system, with access to databases 340(1)-(N). As noted, an example of such access is depicted in FIG. 2 by the various communications paths illustrated therein.

Figure 4:
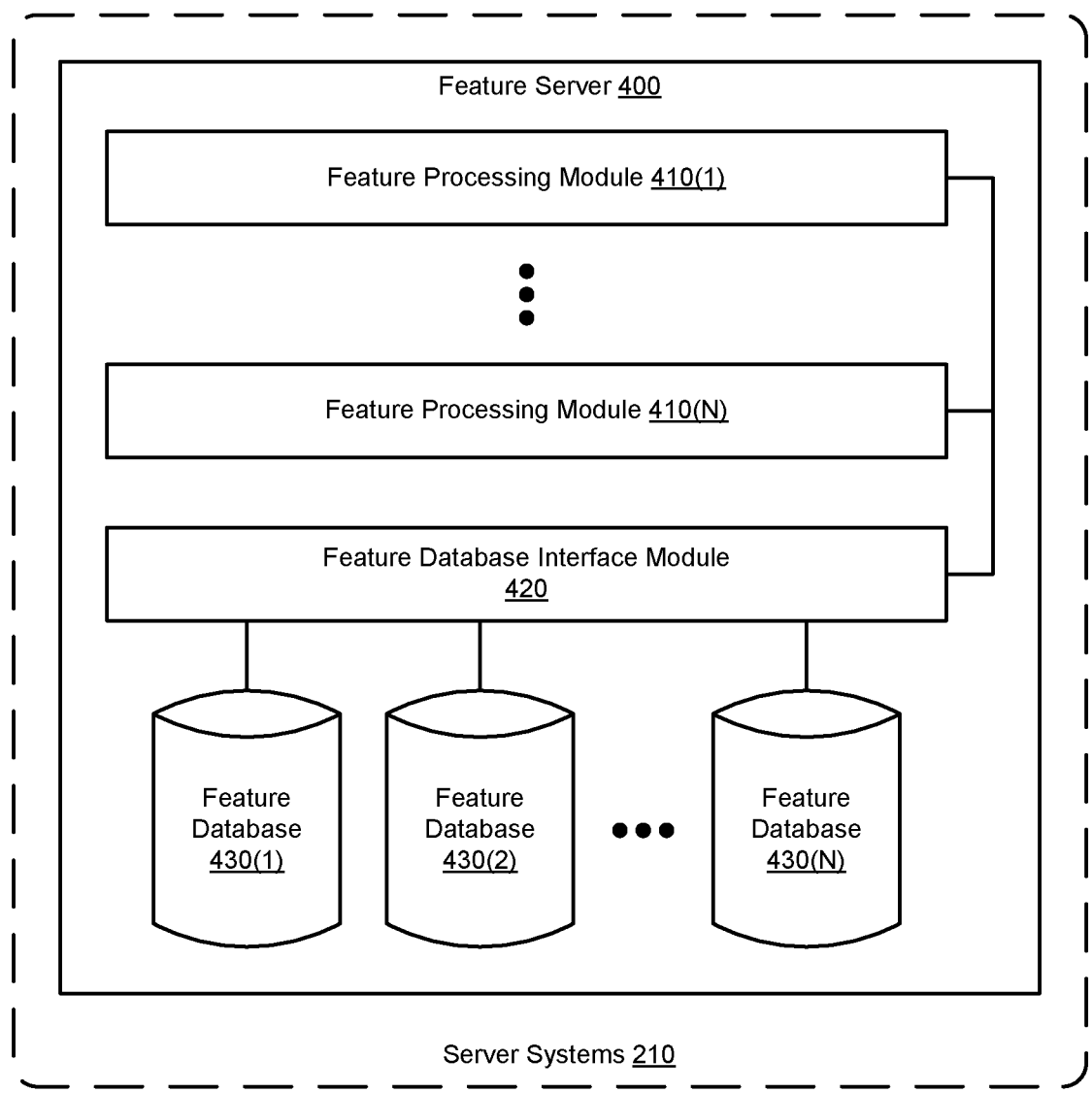
FIG. 4 is a block diagram illustrating an example of a feature server, according to methods and systems such as those disclosed herein.

FIG. 4 is a block diagram illustrating an example of a feature server, according to methods and systems such as those disclosed herein. In the manner of generic server architecture 300, a feature server of server systems 210 is depicted as a feature server 400. In the manner of generic server architecture 300, then, feature server 400 includes one or more feature processing modules (depicted in FIG. 4 as feature processing modules 410(1)-(N), a number of feature databases (depicted in FIG. 4 as feature databases 430(1)-(N)), and interfacing such feature processing modules and feature databases, a feature database interface module (depicted in FIG. 4 as a feature database interface module 420). As noted in connection with FIG. 2, the components of feature server 400 support feature production clients, such as feature production clients 220 of FIG. 2, by maintaining information regarding products (and their features), as may be created and edited using such feature production clients. To this end, feature database interface module 420 can provide other servers of server systems 210, as well as other components of the distributed manufacturing system, with access to feature databases 430. For example, as depicted in FIG. 2, feature database interface module 420 provides production server 262, customization server 266, and web server 268 with access to feature databases 430 via one of the two communication paths depicted therein. A specific and more detailed implementation of a feature server, with regard to the distributed production and shipping/delivery of greeting cards, is provided in connection with FIG. 9.

Figure 5:
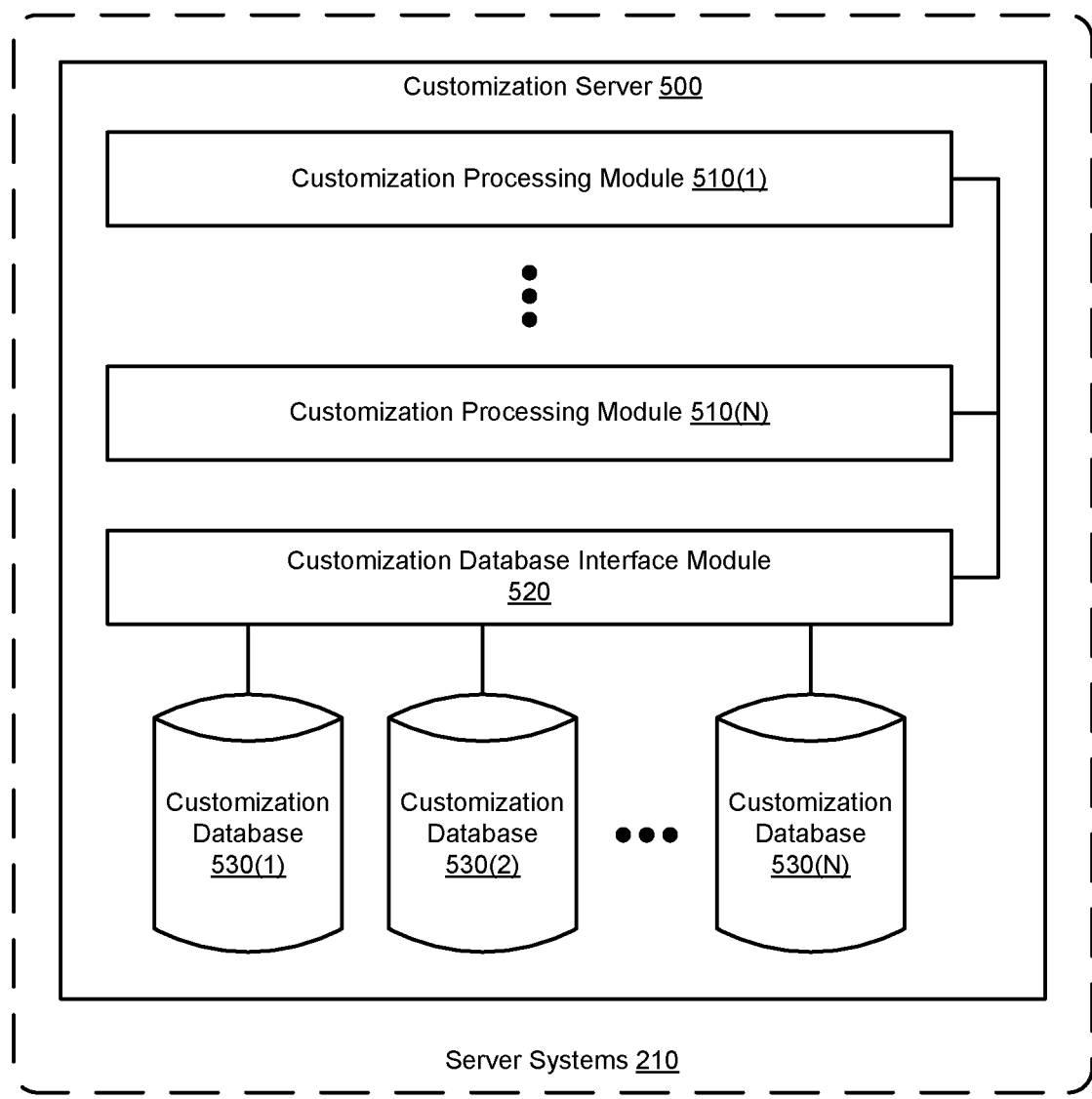
FIG. 5 is a block diagram illustrating an example of a customization server, according to methods and systems such as those disclosed herein.

FIG. 5 is a block diagram illustrating an example of a customization server, according to methods and systems such as those disclosed herein. In the manner noted, server systems 210 can also include one or more customization servers, an example of which is depicted in FIG. 5 as a customization server 500. Customization server 500 includes one or more customization processing modules (depicted in FIG. 5 as customization processing modules 510(1)-(N)), which interface with one or more customization clients such as customization clients 230 of FIG. 2. Customization processing modules 510(1)-(N) can be implemented to support the selection of products and their features, as well as customizations thereto, such as those mentioned earlier, for example. Further, customization processing modules 510(1)-(N) can support user-defined customizations (e.g., using the greeting card example, a handwritten sentiment), the blending of colors, digitally defined customizations (e.g., digitized audio), and/or the like, for example.

In turn, customization processing modules 510 interface via a customization database interface module 520, with one or more customization databases (depicted in FIG. 5 as customization databases 530(1)-(N)). Customization databases 530 maintain digital information regarding customizations made to products and/or their features via one or more customization clients such as customization clients 230 of FIG. 2. In addition to customization processing modules 510 being able to communicate with one another, customization processing modules 510 are able to maintain digital information in one or more of customization databases 530 via customization database interface module 520.

Additionally, customization database interface module 520 can provide other servers of server systems 210, as well as other components of the distributed manufacturing system, with access to customization databases 530. For example, as depicted in FIG. 2, customization database interface module 520 provides feature server 260, production server 262, and web server 268 with access to customization databases 530 via one of the two communication paths depicted therein. A specific and more detailed implementation of a customization server, with regard to the distributed production and shipping/delivery of greeting cards, is provided in connection with FIG. 9.

Figure 6:
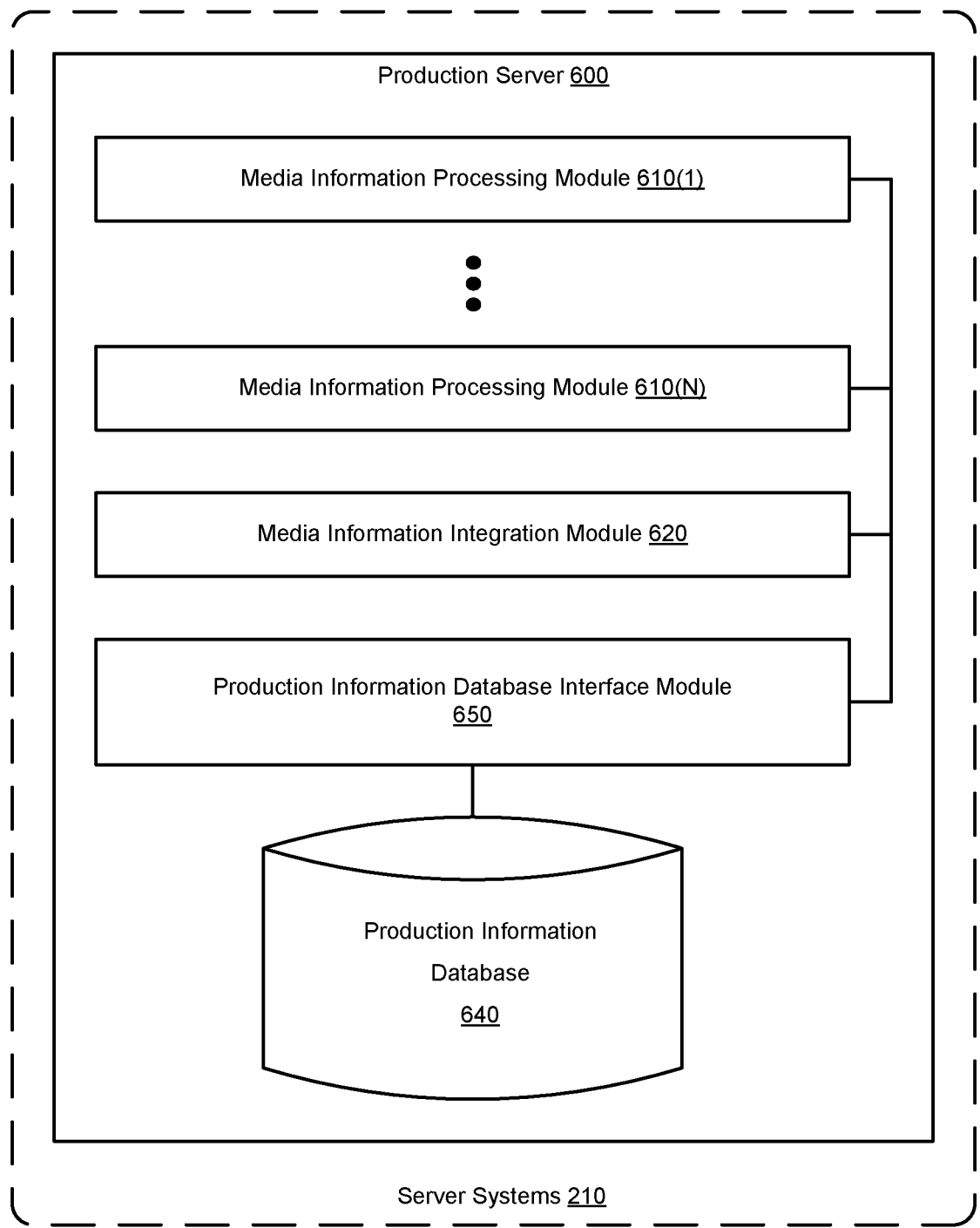
FIG. 6 is a block diagram illustrating an example of a production server, according to methods and systems such as those disclosed herein.

FIG. 6 is a block diagram illustrating an example of a production server, according to methods and systems such as those disclosed herein. Another server included in server systems 210 is a production server (depicted in FIG. 6 as a production server 600). Production server 600 can include a number of components, among them, for example, one or more media information processing modules (depicted in FIG. 6, as media information processing modules 610(1)-(N)), one or more media information integration modules (depicted in FIG. 6 as a media information integration modules 620), and one or more production information databases (depicted in FIG. 6 as a production information database 640), accessed via a production information database interface module (depicted in FIG. 6 as a production information database interface module 650).

To this end, production information database interface module 650 can provide other servers of server systems 210, as well as other components of the distributed manufacturing system, with access to production information database 640. For example, in the manner of production server 262 depicted in FIG. 2, production information database interface module 650 provides certain servers of the server systems (e.g., feature server 260, customization server 266, and web server 268 of FIG. 2) with access to production information database 640 via one of the two communication paths depicted therein, and access thereto to other servers of the server systems (e.g., user information server 264, web server 268, and communications server 270 of FIG. 2) via the other of the two communication paths depicted therein. A specific and more detailed implementation of a production server, with regard to the distributed production and shipping/delivery of greeting cards, is provided in connection with FIG. 9.

As will be appreciated in light of the present disclosure, then, digital feature information and digital customization information can be maintained separately by way of their respective servers, and subsequently integrated by a production server such as production server 600. In such embodiments, media information processing modules such as media information processing modules 610 can aggregate the requisite digital feature information and digital customization information from the appropriate sources (e.g., a feature server such as feature server 400 and a customization server such as customization server 500), and integrate the digital information thus retrieved by way of a media information integration module such as media information integration module 620. Having assembled the requisite digital information, production server 600 can, via communications between media information integration module 620 and production information database 640 via production information database interface module 650, facilitate provision of such digital information to a communications server such as communications server 270 of FIG. 2, for subsequent distribution to the appropriate production node(s).

Figure 7:
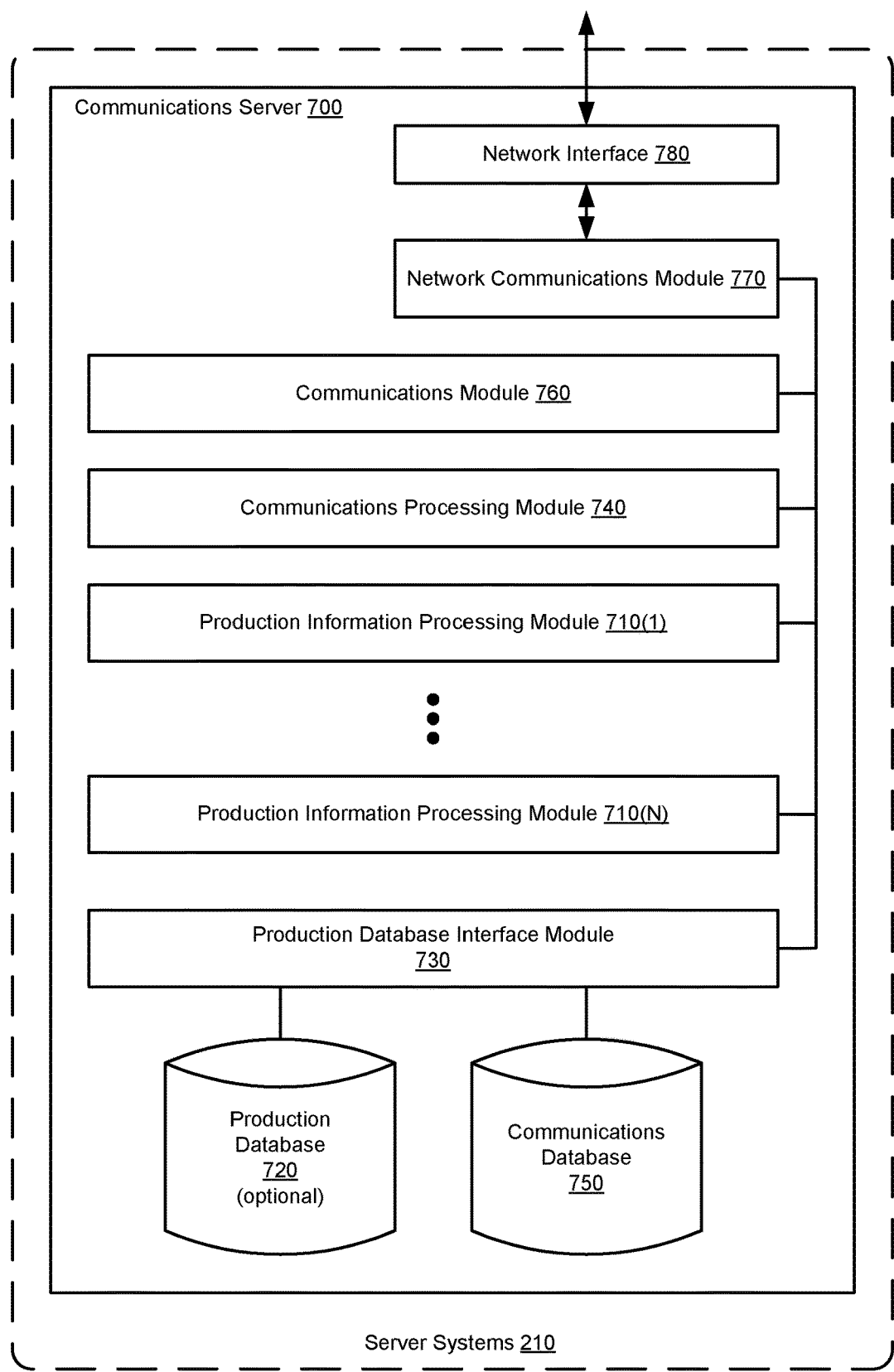
FIG. 7 is a block diagram illustrating an example of a communication server, according to methods and systems such as those disclosed herein.

FIG. 7 is a block diagram illustrating an example of a communication server, according to methods and systems such as those disclosed herein. In certain embodiments, server systems 210 will include for such purposes one or more communications servers, such as a communications server 700. Communications server 700 includes a number of components that support the selection of one or more production nodes (e.g., production nodes 240 of FIG. 2) and the provision of the requisite digital information to the selected production node(s) for production of the product in question. A specific and detailed implementation of a communication server, with regard to the distributed production and shipping/delivery of greeting cards, is provided in connection with FIG. 9.

In one embodiment, communication server 700 includes one or more production information processing modules (depicted in FIG. 7 as production information processing modules 710(1)-(N)). Production information processing modules 710, in certain embodiments, contain the requisite digital information from one or more production servers (e.g., production server 600 of FIG. 6). In those or other embodiments, each of production information processing modules 710 can be configured to process production information for one or more corresponding products to be produced at one or more production nodes. Production information processing modules 710 can maintain such digital information in, for example, a production database (depicted in FIG. 7 as a production database 720) by communicating therewith via a production database interface module 730. In turn (or in parallel), one or more determinations can be made as to the appropriate production node(s) to which such digital production information is to be sent. To this end, such digital information can be integrated into "product descriptions" (digital information that represents some, or more typically all, of the information needed by the particular production node to produce the given product) that are then stored in production database 720.

In support of such operations, production database interface module 730 can provide other servers of server systems 210, as well as other components of the distributed manufacturing system, with access to production database 720. For example, as depicted in FIG. 2, production database interface module 730 provides production server 262, user information server 264, and web server 268 with access to production database 720 via the other of the two communication paths depicted therein (or both, in certain embodiments).

Operations such as those described generally above can be carried out by a communications processing module of communications server 700 (such as is depicted in FIG. 7 as a communications processing module 740). In performing such operations and making such determinations, communications processing module 740 can interface, via production database interface module 730, with a communications database (depicted in FIG. 7 as a communications database 750), and in so doing maintain information regarding the topology of a production network such as is illustrated as distributed manufacturing system architecture 200 in FIG. 2. Once the digital production information is available and the appropriate production node(s) have been identified and selected, such digital production information can be communicated to the production node(s) under the control of a communications module (depicted in FIG. 7 as a communications module 760). Communications module 760 can, for example, retrieve the requisite digital production information from production database 720 and the production node(s) selected from communications database 750, via production database interface module 730. Communications module 760 then controls the communication of this information to the selected production node(s) via a network communications module (depicted in FIG. 7 as a network communications module 770) and a network interface (depicted in FIG. 7 as a network interface 780). In certain embodiments, each of production information processing modules 710 can be configured to process product information for a given product, for example. As noted earlier, production database 720 can, optionally, maintain digital information with regard to completed product descriptions (digital production information), and so (digitally) maintain the information needed to produce a given product.

Example Implementation of a Distributed Manufacturing System

Figure 8:
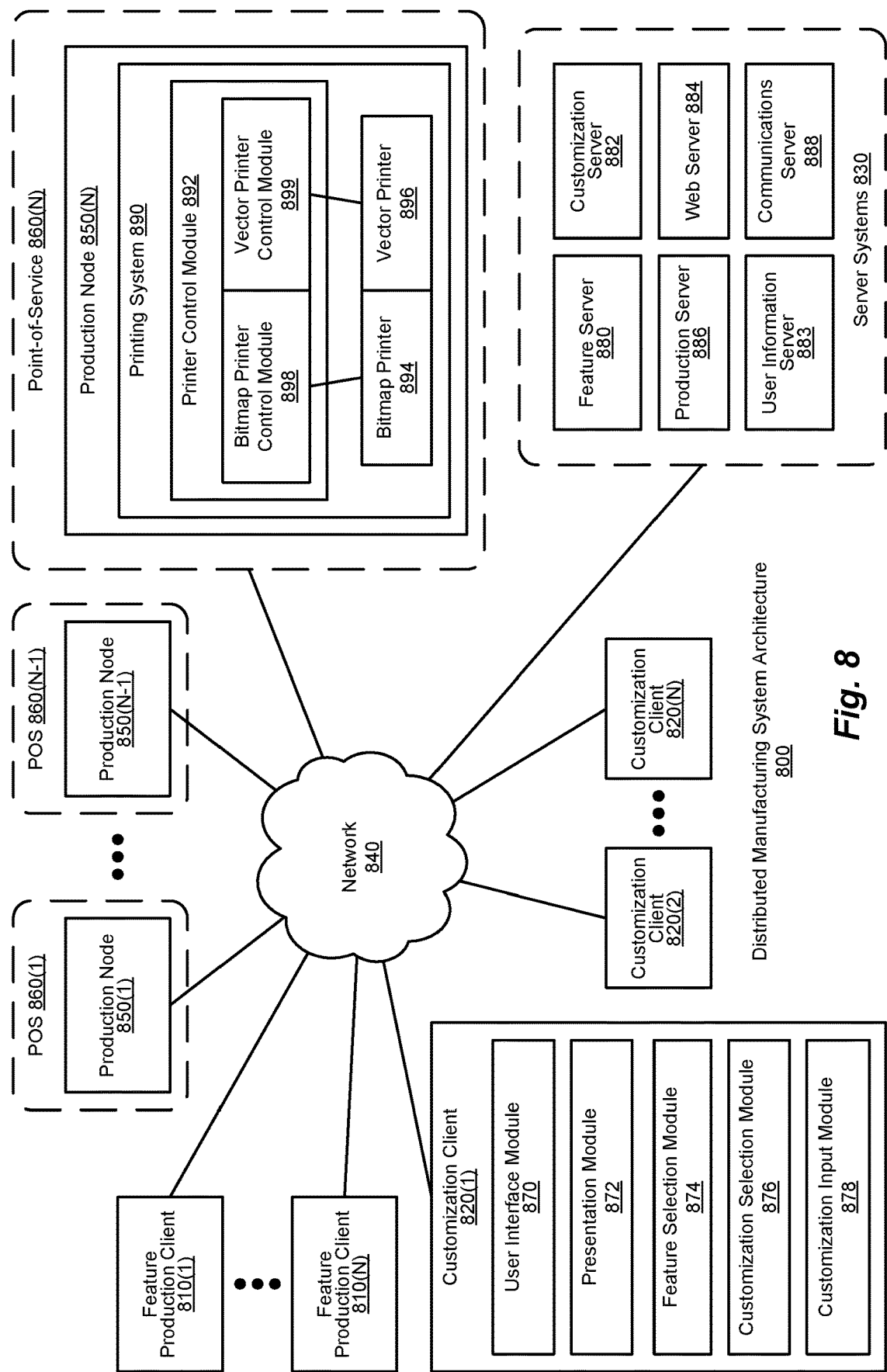
FIG. 8 is a block diagram illustrating an example of a distributed manufacturing system architecture, according to methods and systems such as those disclosed herein.

FIG. 8 is a block diagram illustrating an example of a distributed manufacturing system architecture, according to methods and systems such as those disclosed herein. FIG. 8 thus depicts an example of a distributed manufacturing system architecture according to, for example, distributed manufacturing system architecture 200 (and depicted in FIG. 8 as a distributed manufacturing system architecture 800). In the example presented in FIG. 8, distributed manufacturing system architecture 800 provides for the creation and customization of printed matter by way of multiple printing techniques.

In a manner comparable to that of distributed manufacturing system architecture 200, distributed manufacturing system architecture 800 provides facilities for the creation and customization of the product(s) to be produced (e.g., printed matter printed using multiple printing techniques). In so doing, distributed manufacturing architecture 800 provides a number of feature production clients (depicted in FIG. 8 as feature production clients 810(1)-(N)), multiple customization clients (depicted in FIG. 8 as customization clients 820(1)-(N)), and a number of server systems (depicted in FIG. 8 as server systems 830), which are in communication with one another via a network 840.

Distributed manufacturing system architecture 800 also includes one or more production nodes depicted in FIG. 8 as production nodes 850(1)-(N)), which are situated in various points-of-service (POSs; depicted in FIG. 8 as points-of-service 860(1)-(N)). As will be appreciated in light of the present disclosure, such POSs can be shipping locations (e.g., U.S. POSTAL SERVICE (USPS) locations, UNITED PARCEL SERVICE (UPS) locations, FEDERAL EXPRESS (FEDEX) locations, and/or the like), delivery locations (e.g., for pick up by a delivery service), manufacturing locations, and retail locations (e.g., traditional "brick-and-mortar" retailers, electronic commerce businesses (e.g., AMAZON, E-BAY, and the like), and the like), as well as other locations at which production of a product may be advantageous. To this end, production of a product such as a greeting card, at a location such as a shipping location, can provide various advantages, as is described in greater detail in connection with FIGS. 13A-13F, subsequently. Alternatively (or in combination with taking shipping issues such as those discussed in connection with FIGS. 13A-13F into account), methods and systems such as those described herein can be employed to produce a product such as a greeting card at an electronic commerce business location, thereby providing a consumer with the ability to select an item sold by the electronic commerce business, produce the greeting card at the electronic commerce business's location, and have that greeting card shipped along with the item, to the recipient.

As will also be appreciated in light of the present disclosure, while each of production nodes 850 are depicted in FIG. 8 as being situated within a corresponding one of points-of-service 860, such need not be the case, and it is contemplated by the present disclosure that one or more of production nodes 850 might be situated within a given one of points-of-service 860. Further, while production nodes 850 may give the impression of providing identical manufacturing capabilities, such need not be the case, and, for example, multiple production nodes (each having different capabilities) can be situated within a given one of points-of-service 860.

In the manner of distributed manufacturing system architecture 200, each of feature production clients 810 can employ modules comparable to those of feature production clients 220, as is the case as between customization clients 820 and customization clients 230. Thus, as depicted in FIG. 8, customization client 820(1) includes a number of modules that support functionality applicable to the example presented as distributed manufacturing system architecture 800. That being the case, customization client 820(1), as an example of customization clients 820, includes a user interface module 870, a presentation module 872, a feature selection module 874, a customization selection module 876, and a customization input module 878. In the example presented in FIG. 8, then, feature production clients 810 produce digital feature information representing a given product to be produced and, optionally, one or more features thereof. A user employing customization client 820(1) is then able to produce digital customization information for such product(s) and features by way of user interface module 870 and presentation module 872, which allow a user to manipulate such digital customization information and present the user with the result thereof, respectively. In a manner comparable to that noted earlier, feature selection module 874 allows the user to include or exclude certain features of the product to be produced. Similarly, customization selection module 876 allows the user to include or exclude various customizations of the product to be produced, while customization input module 878 provides the user with the ability to create and apply original customizations to the product to be produced.

Server systems 830, as noted previously, provide support for the aforementioned functionalities, as well as the selection of one or more production nodes appropriate to the production of the given product. Further, such selection can be based on one or more shipping and/or delivery considerations. Thus, server systems 830 therefore include a feature server 880 and a customization server 882, which support the aforementioned functionality. Customization server 882 interacts with a user information server 883 to allow for the maintenance and management of user information, such as user preferences, saved customizations, preferred production nodes, personal information, recipient information, and other such information relevant to the production of the given product. Users accessing feature server 880 and customization server 882 can do so via, for example, a web server 884, which allows access to the various functionalities provided by server systems 830, as part of their duties within distributed manufacturing system architecture 800. Also as before, a production server 886 aggregates digital information from feature server 880 (digital feature information, not shown) and customization server 882 (digital customization information, not shown). Production server 886 provides this information to a communications server 888, which, in part, selects one or more of production nodes 850 to produce the product in question and conveys the requisite digital information to the selected production node(s).

In turn, production nodes 850 include not only the requisite computational hardware and software to effect production of the printed matter, but also the printing systems needed to effect the requisite physical actions of production (depicted in FIG. 8 as a printing system 890). As is depicted in FIG. 8, printing system 890 of production node 850(N) includes a printer control module 892, which controls a bitmap printer 894 and a vector printer 896, by way of a bitmap printer control module 898 and a vector printer control module 899, respectively. In such an implementation, the digital information processed and maintained by server systems 830 can include bitmap digital information and vector digital information. Thus, the digital feature information noted earlier can include bitmap digital feature information and vector digital feature information. Similarly, the digital customization information noted earlier can include bitmap digital customization information and vector digital customization information. However, in another embodiment, the digital information processed and maintained by server systems 830 is divided between digital feature information that is bitmap digital information, and digital customization information that is vector digital information. In the latter scenario, digital feature information is sent through bitmap printer control module 898 to bitmap printer 894, while digital customization information is sent through vector printer control module 899 to vector printer 896. In such an embodiment, bitmap printer 894 can be, for example, a color inkjet printer, and vector printer 896, a pen plotter, handwriting machine, or other mechanized writing system, in which case, digital feature information would employ a pixel-oriented format (e.g., JPEG, TIFF, BMP, or other such format) and digital customization information would employ a vector-oriented format (e.g., ENCAPSULATED POSTSCRIPT (EPS), ADOBE ILLUSTRATOR (AI), or the like).

Alternatively, or in combination with the foregoing, a product to be produced and its various features can be defined, in whole or in part, by digital information configured to control three-dimensional (3D) printing (also referred to as additive manufacturing (AM)), computer numeric control (CNC) machining, injection molding, robotic painting and assembly, and other automated production processes capable of using digital information to produce a given product. In a POP providing such facilities, for example, a base product (potentially with one or more modifications) can be produced by a 3D printer and/or an injection molder. Such 3D printing/injection molding can use material of a certain color, texture, and so on, during or after which, various modifications can be made. Various customizations can then be implemented. Such customizations can include robotic painting of the customized product with designs, solid colors, patterns, and so on. For example, a printing process such as pad printing (also referred to as tampography) can be employed to transfer a two-dimensional (2D) image onto the three-dimensional (3D) object thus produced. Such printing can be accomplished using an indirect offset (gravure) printing process that involves an image being transferred from one surface (referred to as the clichè) via a silicone pad onto a substrate (e.g., the surface of the product). Such a technique can also be used to deposit functional materials such as conductive inks, adhesives, dyes and lubricants. As will be appreciated in light of the present disclosure, such a printing process is able to transfer an image from a planar surface (e.g., on which the image and/or functional material has been deposited) to a variety of surfaces, such as flat, cylindrical, spherical, compound angles, textures, concave, or convex surfaces, which can be particularly advantageous in situations in which the exact shape of the product's surface is not definitively known a priori (as can be the case in embodiments such as those described herein). In conjunction with the aforementioned multiple media printing process, the production and shipping/delivery of an item with an accompanying greeting card can be envisioned.

Figure 9:
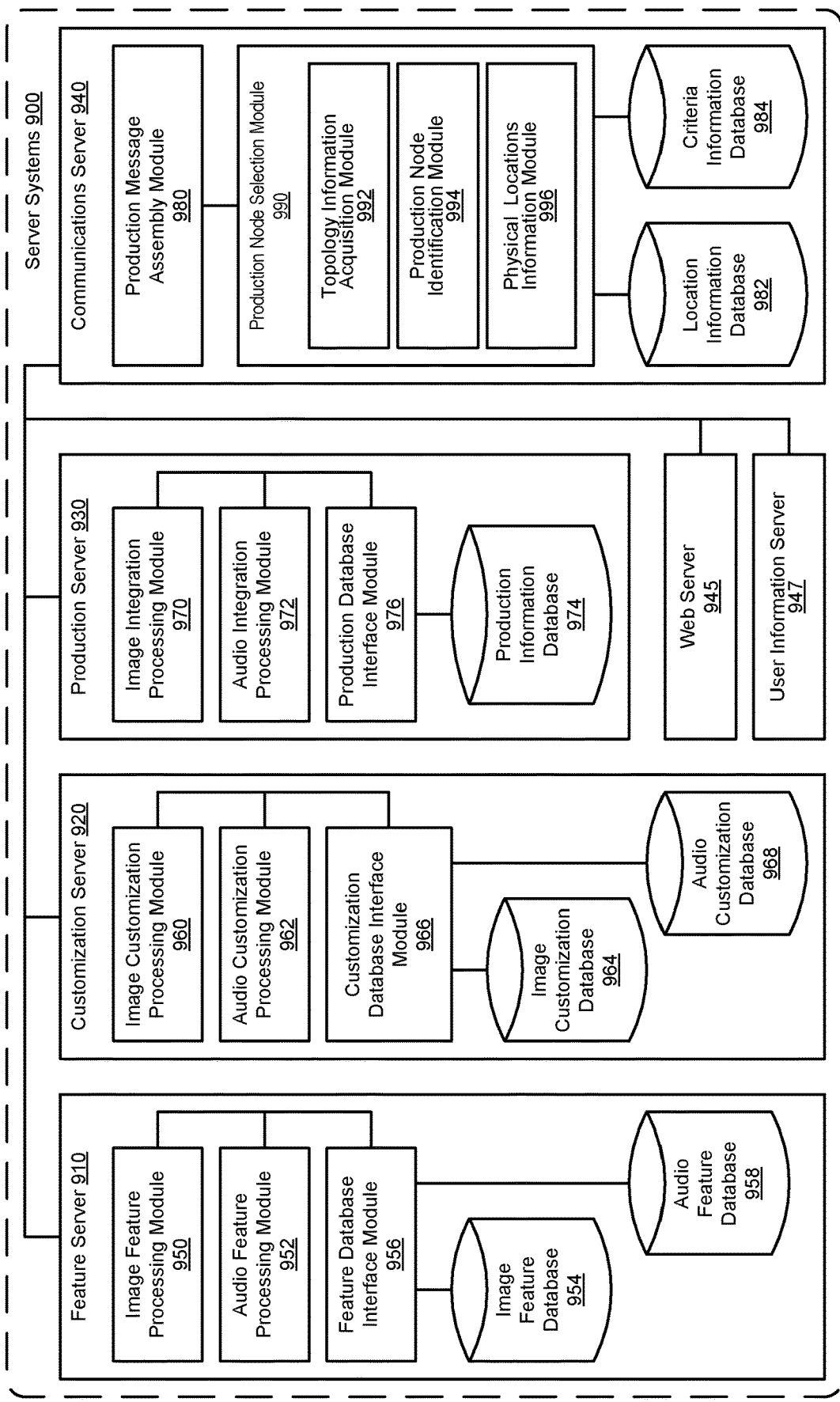
FIG. 9 is a block diagram illustrating an example of a server systems architecture, according to methods and systems such as those disclosed herein.

FIG. 9 is a block diagram illustrating an example of a server systems architecture for multiple printed/audio media, according to methods and systems such as those disclosed herein. The server systems depicted in FIG. 9 (server systems 900) illustrate server systems such as those of server systems 830, in greater detail. Thus, for example, server systems 900 include a feature server 910, a customization server 920, a production server 930, and a communications server 940, among other such servers. Also included in server systems 900 are a web server 945 and a user information server 947, which provide functionality such as that described earlier herein.

As before, with regard to feature server 880, feature server 910 includes an image feature processing module 950 and an audio feature processing module 952. Image feature processing module 950 provides functionality that enables users of feature production clients 810 (referred to herein as feature creators or authors) to create features of the aforementioned printer matter (e.g., the creation of one or more images, as well as the ability to print such images as part of the aforementioned printer matter). Similarly, in products supporting such functionality, audio feature processing module 952 provides functionality related to the generation of audio features for such printed matter. Examples of such image features and audio features include photographs, graphic art, music, spoken word, and other such images and audio content. Image feature processing module 950 can maintain such information digitally in an image feature database 954, with which image feature processing module 950 communicates via a feature database interface module 956. Similarly, audio feature processing module 952 can maintain digitized audio information in an audio feature database 958, with which audio feature processing module 952 communicates via feature database interface module 956.

In a manner comparable to that described earlier, customization server 920 includes an image customization processing module 960 and an audio customization processing module 962. Image customization processing module 960 can implement customizations (in the form of digital customization information) that can be used in the production of the given printed matter, in order to customize the product produced (in this example, the printed matter). Such functionality can include modification of images provided for the product, the addition of images, and other such visual customizations. Image customization processing module 960 can maintain such digital information in an image customization database such as an image customization database 964 depicted in FIG. 9. Image customization processing module 960 maintains such digital information in image customization database 964 via a customization database interface module 966. In similar fashion, audio customization processing module 962 supports customizations to audio content included in the product being produced as part of that product's production. Audio customizations can be maintained by audio customization processing module 962 in an audio customization database 968, via customization database interface module 966. Such audio customizations can include music, the recording of a sentiment by the user, spoken word content, and the like, as may be recorded and/or available in a digitized form. Such audio features can be included with the printed matter by way of, for example, a small electronic audio playback device that is a part of the physical item (e.g., an audio playback device such as that provided as part of a greeting card).

Production server 930, in certain embodiments, integrates digital feature information from feature server 910 and digital customization information from customization server 920, for provision to one or more production nodes that are to be tasked with the product's production. Such integration can, for example, be accomplished by applying one or more of the customizations to the digital information representing the product itself, or to one or more of the features thereof. Examples of such customizations and their integration include, for example, the addition of handwritten sentiments on printed matter, mixing of audio from authors and customers, selection of paper by the customer, and other such alternatives.

To accomplish such integration, production server 930 includes a number of components, including an image integration processing module 970 and an audio integration processing module 972. Image integration processing module 970 integrates digital image information from feature server 910 and customization server 920, while audio integration processing module 972 integrates digital audio information from feature server 910 and customization server 920. Image integration processing module 970 and audio integration processing module 972 can maintain such integrated digital information in a production information database such as a production information database 974, via a production database interface module 976. Thus, for example, image integration processing module 970 can integrate digital feature information (e.g., a digital representation of an image that is to be printed on the printed matter (e.g., in a bitmap format)) and digital customization information (e.g., a digital representation of a handwritten sentiment to be printed on the printed matter (e.g., in a vector format)) into a file or other unit of digital storage. Similarly, audio integration processing module 972 can integrate digital feature information (e.g., a digital representation of an audio feature (e.g., music in MP3 format)) and digital customization information (e.g., spoken words in WAV format)) by performing a mixing operation (e.g., that results in single file or other unit of digital storage in WMA format). The digital information representing the product, including its various features, having been customized, can then be stored as a product description in production information database 974.

Communications server 940, in turn, includes a number of components that support the communication of such digital production information (i.e., product descriptions and their associated information) from one or more of server systems 900 to the selected one(s) of production nodes 850. Communications server 940 thus includes a production message assembly module 980, a location information database 982, a criteria information database 984, and a production node selection module 990. In turn, production node selection module 990 includes a topology information acquisition module 992, a production node identification module 994, and a physical locations information module 996.

As generally discussed earlier, communications server 940 and the components thereof provide facilities and associated mechanisms for the identification and selection of production nodes 850 to produce the product in question (here, the printed matter to be produced, for example). Components of production node selection module 990 that support such determinations include production node identification module 994, which, in turn, employs topology information acquisition module 992 and physical locations information module 996. Topology information acquisition module 992 provides production node identification module 994 with information regarding network topology, shipping area structure(s), and the like, in part by processing digital information maintained in location information database 982 (e.g., including information regarding physical locations (e.g., those of available production nodes, destination addresses/locations, and so on), network topology, shipping area structure(s), and other such information), as well as, potentially, information provided by user information server 947. Physical locations information module 996 provides production node identification module 994 with information regarding the physical location of the product's ultimate destination (e.g., the physical address of the product's recipient), points-of-service (e.g., POS status, type, and so on), outages (e.g., POP status, network failures, shipping system outages, transportation problems, traffic conditions, and so on), delays (e.g., due to weather events, transportation problems, traffic conditions, and so on), and other factors, the physical location of which may affect the production nodes identified, by accessing location information database 982, as well as, potentially, using information provided by user information server 947. In this regard, it will be appreciated that, in a general sense, topology information acquisition module 992 and physical locations information module 996 can access information maintained by user information server 947, as part of making such determinations.

In operation, production node selection module 990 selects one or more production nodes, for production of the products to be produced, from those identified by production node identification module 994. Production node identification module 994 identifies such production nodes, in part, using information provided by topology information acquisition module 992 and physical locations information module 996, as well as direct access to location information database 982. To provide production node identification module 994 with the requisite information, topology information acquisition module 992 accesses location information database 982, and physical locations information module 996 accesses location information database 982 and criteria information database 984.

Topology information acquisition module 992 analyzes information from location information database 982 to determine network topology and shipping area structure(s). This analysis includes determinations as to network topology within a given logical or logistical distance of the destination (and more particularly, such distances with respect to potential points-of-service), overall network topology, the topology of the shipping area structure(s) involved (including physical distance and/or shipping/delivery distance), and other such topological factors.

Physical locations information module 996 analyzes information from location information database 982 and criteria information database 984 to identify, in view of such criteria, a set of one or more production nodes eligible for further analysis by production node identification module 994 in identifying the production nodes at which the product is to be produced. To this end, physical locations information module 996 analyzes information from location information database 982 that can include, for example, information regarding the geographic locations of destination(s), the locations of various points-of-service, shipping area structure(s), outages, delays, and other location-centric factors, among other such information. Physical locations information module 996 performs such analysis in view of information from criteria information maintained in criteria information database 984, such as, for example, shipping/delivery time desired/needed for receipt of the product, the time desired/needed for a particular production node to produce the product, cost of production, environmental factors, and other such criteria.

Examples of processes that can be performed by topology information acquisition module 992 and production node identification module 994 to effect such identification and selection operations are discussed in greater detail in connection with FIGS. 13A-F and 14A, subsequently.

Production node identification module 994 can also access location information in location information database 982 and criteria information in criteria information database 984 directly, in order to process information received from topology information acquisition module 992 and physical locations information module 996. For example, production node identification module 994 can use criteria from criteria information in criteria information database 984 to rank the production nodes identified and point-of-service location information from location information database 982 to exclude points-of-service that fail to meet service requirements, and so on.

From the production nodes identified by production node identification module 994, production node selection module 990 then selects the production node(s) at which the given product(s) is (are) to be produced. As with production node identification module 994, production node selection module 990 can access information maintained in location information database 982 and criteria information in criteria information database 984 to make such selection(s). Further, production node selection module 990 may access user information maintained by user information server 947. In so doing, production node selection 990 is able to select one or more production nodes that satisfy the given criteria. Such a determination can be based on, for example, the destination (e.g., the physical address of the recipient), the capabilities of the various potential production nodes, the shipping area structure(s) involved, the product to be produced and features thereof, and other such considerations.

Once the appropriate production node(s) are identified and selected, and the requisite product description(s) (here, digital image information and digital audio information (both for product features and customizations)) assembled, a production message is assembled by production message assembly module 980 (including, e.g., the product description for the customized product and its features), and is sent to the selected production node(s).

In view of the foregoing and as noted elsewhere herein, it will be appreciated that various ones of feature server 910, customization server 920, production server 930, communications server 940, web server 945, and user information server 947, and/or other servers that can make up server systems 900 (not shown), can be combined in various ways, as may be desired, and are simply shown as separate servers to simplify the description of such functions. Such is also the case for various ones of the databases of server systems 900, including for example, feature database 954, audio feature database 958, customization database 964, audio customization database 968, production information database 974, location information database 982, criteria information database 984, with the storage of their respective information combined in various ways, so as to provide fast, efficient, and easily understood operation, both for such databases themselves and the systems relying on such databases for needed information.

Example Processes for a Distributed Manufacturing System

Figure 10:
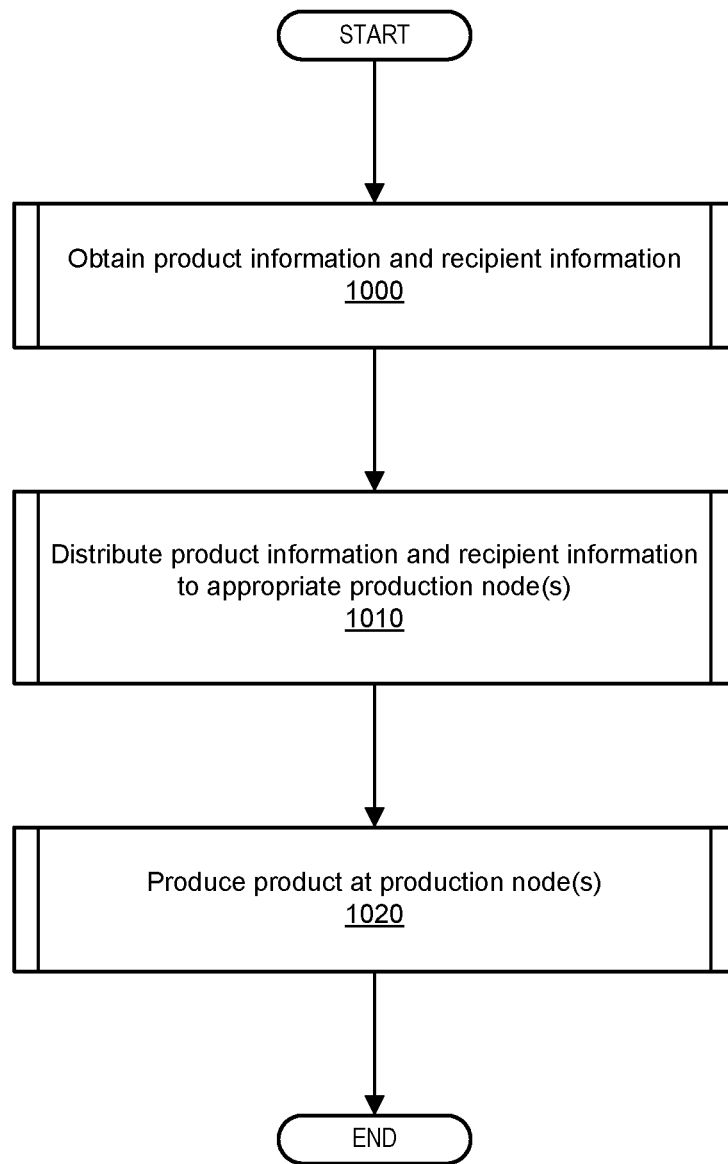
FIG. 10 is a simplified flow diagram illustrating an example of operations performed in producing a product in a distributed manufacturing system, according to methods and systems such as those disclosed herein.

FIG. 10 is a simplified flow diagram illustrating an example of operations performed in producing a product in a distributed manufacturing system, according to methods and systems such as those disclosed herein. The process depicted in FIG. 10 illustrates an example of a process for producing a product that can be implemented in an architecture such as distributed manufacturing system architecture 200 of FIG. 2. The process illustrated in FIG. 10 begins with obtaining product information and recipient information (1000). Processes that can be performed to obtain product information include a process for the creation of a digital description of a product (e.g., as through the use of one or more feature production clients), a process for the creation of features of that product (e.g., again through the use of one or more feature production clients), and a process for the customization of such products and features (e.g., as through the use of one or more customization clients). With regard to the first two processes, such processes are supported by server systems 210 of FIG. 2, and more particularly, by a feature server such as feature server 260 by way of a web server such as web server 268, in creating products and their features, which can then be customized by a user of such a customization client. To this end, and with regard to the last process noted, an example of a product customization process is described in greater detail in connection with FIG. 11, subsequently. When obtaining such product information, recipient information can also be obtained (e.g., by way of receipt from one or more customization clients, by retrieving recipient information from a user information server, or other such sources).

Once the requisite product information and recipient information have been obtained, such product information and recipient information are distributed to one or more production node(s) (1010). As will be appreciated in light of the present disclosure, such distribution includes the identification and selection of the production node(s) that are to receive such product information and recipient information, and so will be tasked with producing the product(s) in question. Examples of operations performed in the distribution of product information and recipient information are described in further detail in connection with FIGS. 12, 13A-F, 14A, 14B, and 15, subsequently. The requisite product information and recipient information having been distributed, the product(s) in question is (are) produced at the appropriate production node(s) (1020). Examples of operations performed in producing a product according to the methods and systems described herein are described in further detail in connection with FIGS. 15, 16, and 17, subsequently.

Figure 11:
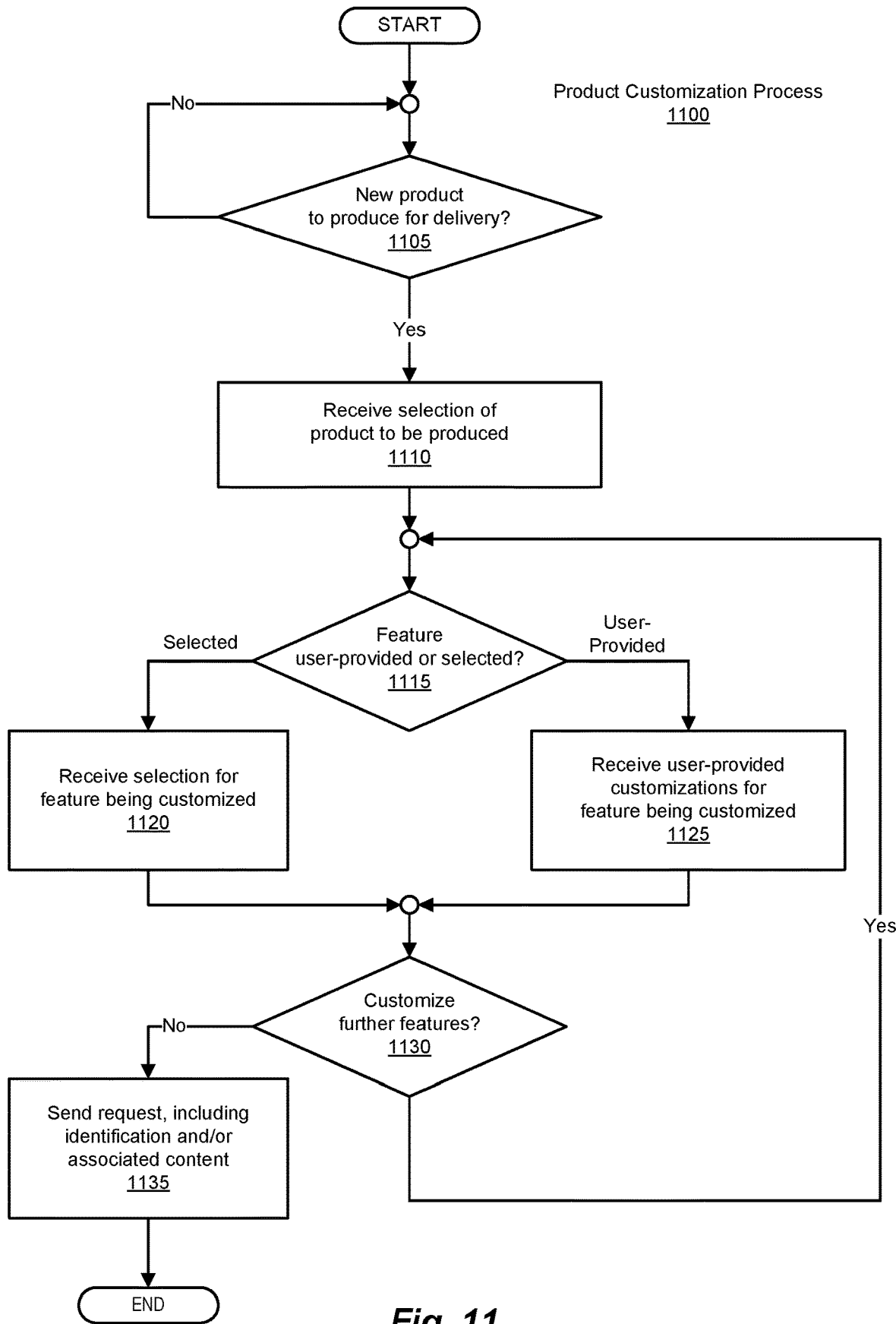
FIG. 11 is a simplified flow diagram illustrating an example of a product customization process, according to methods and systems such as those disclosed herein.

FIG. 11 is a simplified flow diagram illustrating an example of a product customization process, according to methods and systems such as those disclosed herein. The process of FIG. 11, referred to as a product customization process 1100, can be performed using one or more customization clients such as customization clients 230 of FIG. 2. As with the creation of products and product features, the process of product customization process 1100 can be supported by server systems 210 of FIG. 2, and more particularly, by a feature server such as feature server 260 by way of a web server such as web server 268, in customizing products and their features.

Product customization process 1100 begins with a determination as to whether a new product is to be produced (1105). Until such time as a user (e.g., of one of customization clients 230) indicates that a new product is to be produced, product customization process 1100 loops. Upon receiving an indication that a new product is to be produced (e.g., by way of web server 268 and production server 262, for example), product customization process 1100 receives the selection of the product to be produced (1110). Receipt of such selection can be included in communications regarding the customizations of the given product and/or its features, by way of an indication to produce a product that has already been customized, or by some other method. A determination is then made as to whether the feature in question that is to be customized will be based on digital customization information selected by the user or provided by the user (1115).

In the simpler case, a user (by way of a customization client such as customization client 230) is presented with some number of alternatives from which the user can select the desired feature and/or customizations thereto. In such a case, the selection(s) is (are) received from the customization client for the feature being customized at, for example, a customization server such as customization server 266 (1120). Alternatively, if a given feature is to be included/excluded or customized by way of user-provided customizations (e.g., as reflected in the given digital customization information), product customization process 1100 proceeds to the receipt of such user-provided customizations for the product/feature(s) being customized (1125). As before, a user of a customization client such as customization client 230(N) provides such information by way of, for example, web server 268 and customization server 266. As will be appreciated in light of the present disclosure, such inclusion/exclusion and customization is supported in customization client 230(N), for example, by way of feature selection module 294 (allowing the user to include/exclude certain features), customization selection module 296 (allowing the user to select from a number of customizations presented by way of presentation module 292 and user interface module 290), and customization input module 298 (which supports the receipt, modification, management, and other manipulation of user-provided customizations).

A determination is then made as to whether additional features are to be configured (1130). As will be appreciated in light of the present disclosure, the features of a given product that might be customized according to methods and systems such as those disclosed herein will vary by product and feature. Further, such alternatives can be affected by the capabilities available in the productions node(s) subsequently selected, highlighting the potential for interplay between customizations and the production nodes capable of implementing such customizations. If further features remain to be customized, the process loops to the receipt of such customizations (1130). Once the desired customizations have been implemented according to product customization process 1100, the request for the production of the product is sent (1135). Such a request can include, for example, identification of the product to be produced, features to be included, customizations to be made in the production of the product, and/or associated content for use in the production of the product (e.g., audio content). Product customization process 1100 then concludes.

Figure 12:
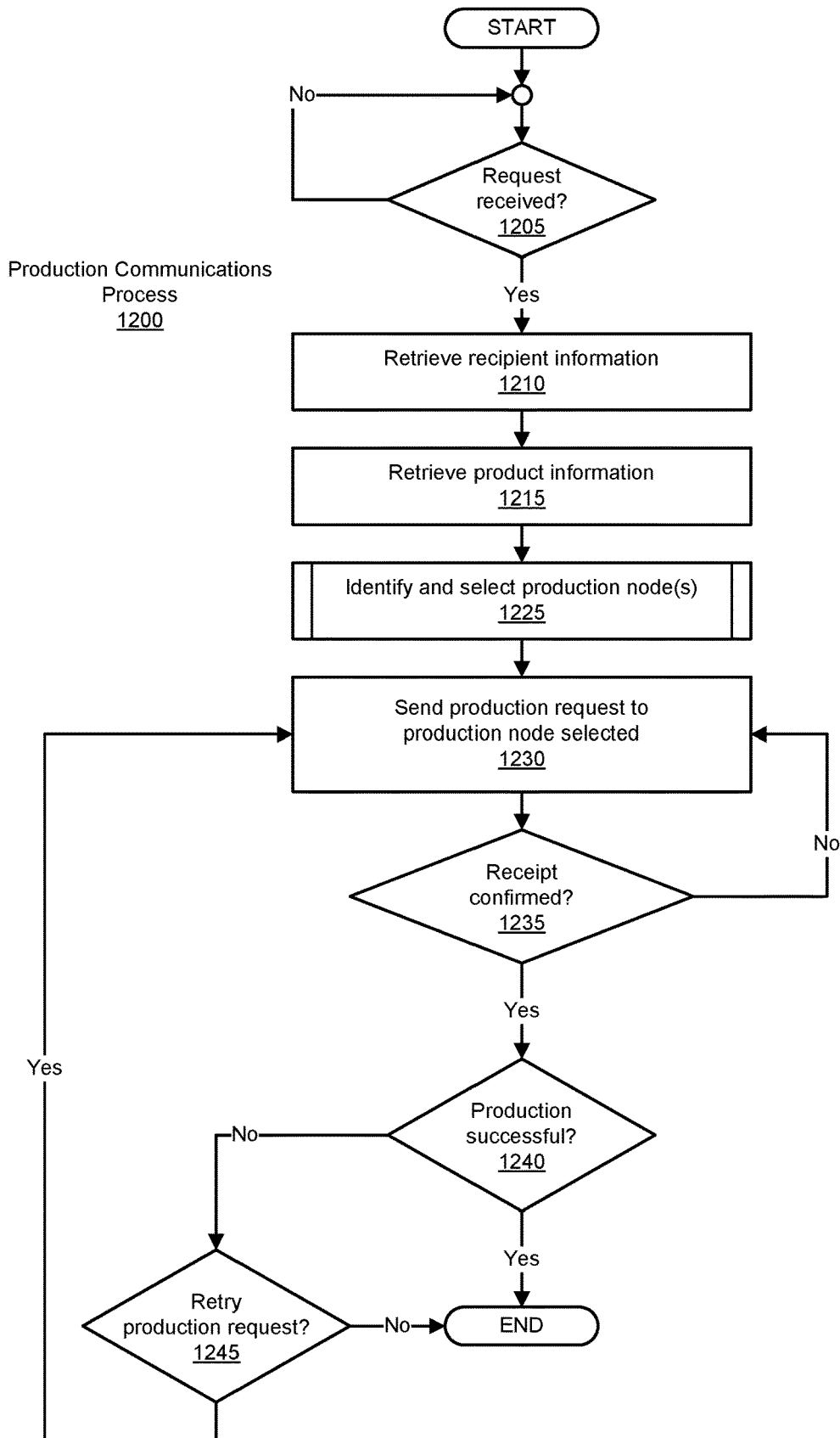
FIG. 12 is a simplified flow diagram illustrating an example of a production communications process, according to methods and systems such as those disclosed herein.

FIG. 12 is a simplified flow diagram illustrating an example of a production communications process, according to methods and systems such as those disclosed herein. FIG. 12 thus illustrates a production communications process 1200. Production communications process 1200 can be effected by way of a communications server such as communications server 270 of FIG. 2, in conjunction with production server 262 (and so, in further conjunction with feature server 260 and customization server 266).

Production communications process 1200 begins with a determination as to whether a request (for the production of a given product) has been received (1205). While no such requests have been received, production communications process 1200 loops. Upon receipt of a production request, recipient information is retrieved (1210). Recipient information can be retrieved from the request itself, from information maintained by a user information server such as user information server 264, or from some other source, as may be indicated in the request or other associated information. Product information (e.g., digital product description information such as digital feature information, digital customization information, and the like) is retrieved as part of production communications process 1200 (1215). Such product information can be retrieved, for example, from a production server such as production server 262. Once the requisite product information and recipient information have been retrieved, a determination is made as to which of the production nodes (e.g., production nodes 240) the information will be sent (1225). The process of identifying and selecting the production node(s) to be selected is described in greater detail in connection with FIGS. 13A, 13B, and 13C, subsequently.

Having retrieved the requisite product information and recipient information, as well as having selected the production node(s) at which the product(s) is (are) to be produced, a production request reflecting such information is sent to the production node(s) thus selected (1230). A determination is then made as to whether receipt of the production request by the given production node(s) has been received (1235). If such receipt is not confirmed, another attempt is made to send the production request to the production node(s) selected. Otherwise, receipt having been confirmed by the selected production node(s), a determination is made as to whether production of the product was successful (1240). If an indication is received that production was not successful, a determination is made as to whether the sending of the production request should be retried (1245). As before, if the production request is to be resent, production communications process 1200 resends the production request to the production node(s) in question (1230). Otherwise, if production was successful (1240) or another attempt to send the production request is not to be made (1245), the process concludes.

Figure 13A:
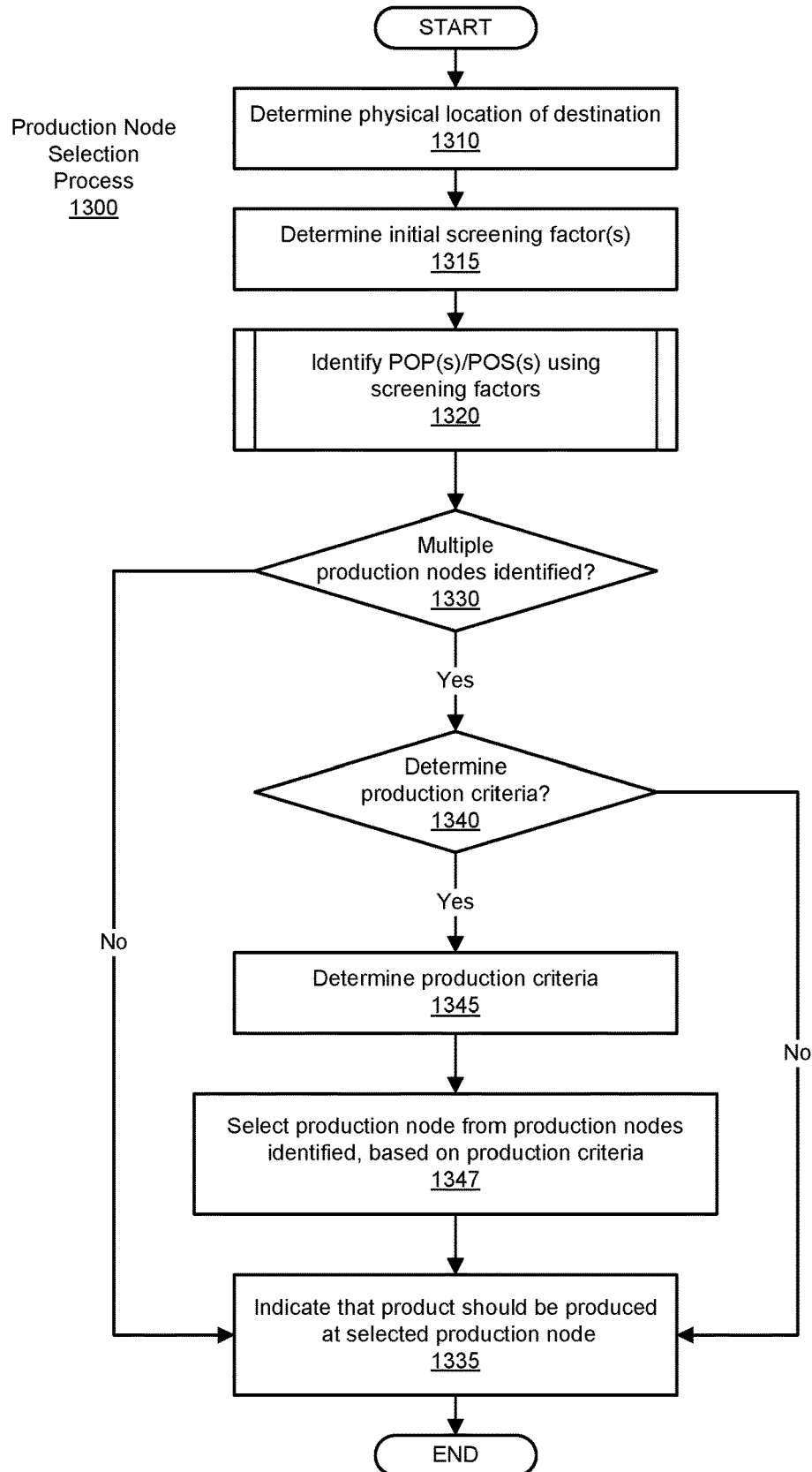
FIG. 13A is a simplified flow diagram illustrating an example of a production node selection process, according to methods and systems such as those disclosed herein.

FIG. 13A is a simplified flow diagram illustrating an example of a production node selection process, according to methods and systems such as those disclosed herein. FIG. 13A thus illustrates a production node selection process 1300, which can be performed, for example, by a production node selection module such as production node selection module 990 of FIG. 9.

Production node selection process 1300 begins with a determination as to the physical location of the destination of the product(s) to be produced (e.g., the physical address of the recipient) (1310). Factors for use in an initial level of screening are then determined (e.g., by a production node selection module, in certain embodiments) (1315). Such factors can, for example, be one or more of the factors discussed elsewhere herein. For example, such screening factors can be used to eliminate POPs from consideration based on geographic location, POS characteristics (e.g., shipping services available at such POSs), POP characteristics (e.g., the ability to perform 3D printing), and/or other such considerations. In so doing, such screening can provide improved performance (e.g., speed and efficiency) in the process of selection and identification of POPs by reducing the number of POPs/POSs needing to be examined in subsequent operations (and potentially, obviating the need to perform such subsequent operations). Such screening and the physical location of the product's destination having been determined (e.g., by the production node selection module's topology information acquisition module and physical locations information module), one or more POPs/POSs are identified based on the aforementioned screening factors (e.g., by the production node selection module's production node identification module) (1320).

As will be further understood in light of the present disclosure, the identification of product node(s) by such a screening process can be affected, in certain embodiments by one or more other criteria, such as can be maintained in a criteria information database. Production criteria can also include the product, features of product, and/or customizations thereto, among other such criteria. As noted, identification and selection of production nodes can take into account that certain production nodes may make better customizations, some may not support customization (or at least, a given customization), others may support special customizations, and other such permutations.

Based on the initial screening, a determination can then be made as to whether such identification has resulted in the identification of multiple production nodes (1330). At this juncture, it will be appreciated that production node identification can be performed by a production node identification module such as production node identification module 994 of FIG. 9, which, in turn, employs functionalities provided by topology information acquisition module 982 and physical locations information module 996 in accessing location information database 982 and criteria information database 984, and processing the digital information retrieved therefrom.

In the case in which only a single node has been identified (a determination that can include the use of one or more criteria, such as the production node's capabilities), information regarding the production of the product(s) (identified in the earlier-received production request) is sent to the selected production node. To this end, an indication is made to this effect (1335). Production node selection process 1300 then concludes.

In the case in which multiple production nodes are identified, a determination is made as to the applicable production criteria to be employed (1340). In the case in which no production criteria have been identified by the communications server (and more particularly, the production node identification module), the production node selection module can use some manner of default selection criteria to narrow the results down to a single production node (or a set of desirable production nodes), at which the desired product(s) will be produced. To this end, an indication is made to this effect (1335). Production node selection process 1300 then concludes.

In the case in which production criteria are available, a determination is made as to those production criteria and their use (1345). As noted elsewhere herein, such production criteria can include a wide variety of constraints and parameters, such as, for example, shipping/delivery time desired/needed for receipt of the product, the time desired/needed for a particular production node to produce the product, cost of production, environmental factors, the destination (e.g., the physical address of the recipient), the capabilities of the various potential production nodes, the shipping area structure(s) involved, the product to be produced and features thereof, and other such considerations. Further, in addition (or as an alternative) to taking into account such present factors, historical information regarding one or more such factors can be observed and maintained, and used to make the aforementioned determinations. One alternative in this regard is the use of a given POP's historical performance as a selection factor. Based on such production criteria, one or more production nodes that satisfy the given criteria are selected from the available production nodes identified, based on the given production criteria (1347). To this end, an indication is made to this effect (1335). Production node selection process 1300 then concludes.

Figure 13B:
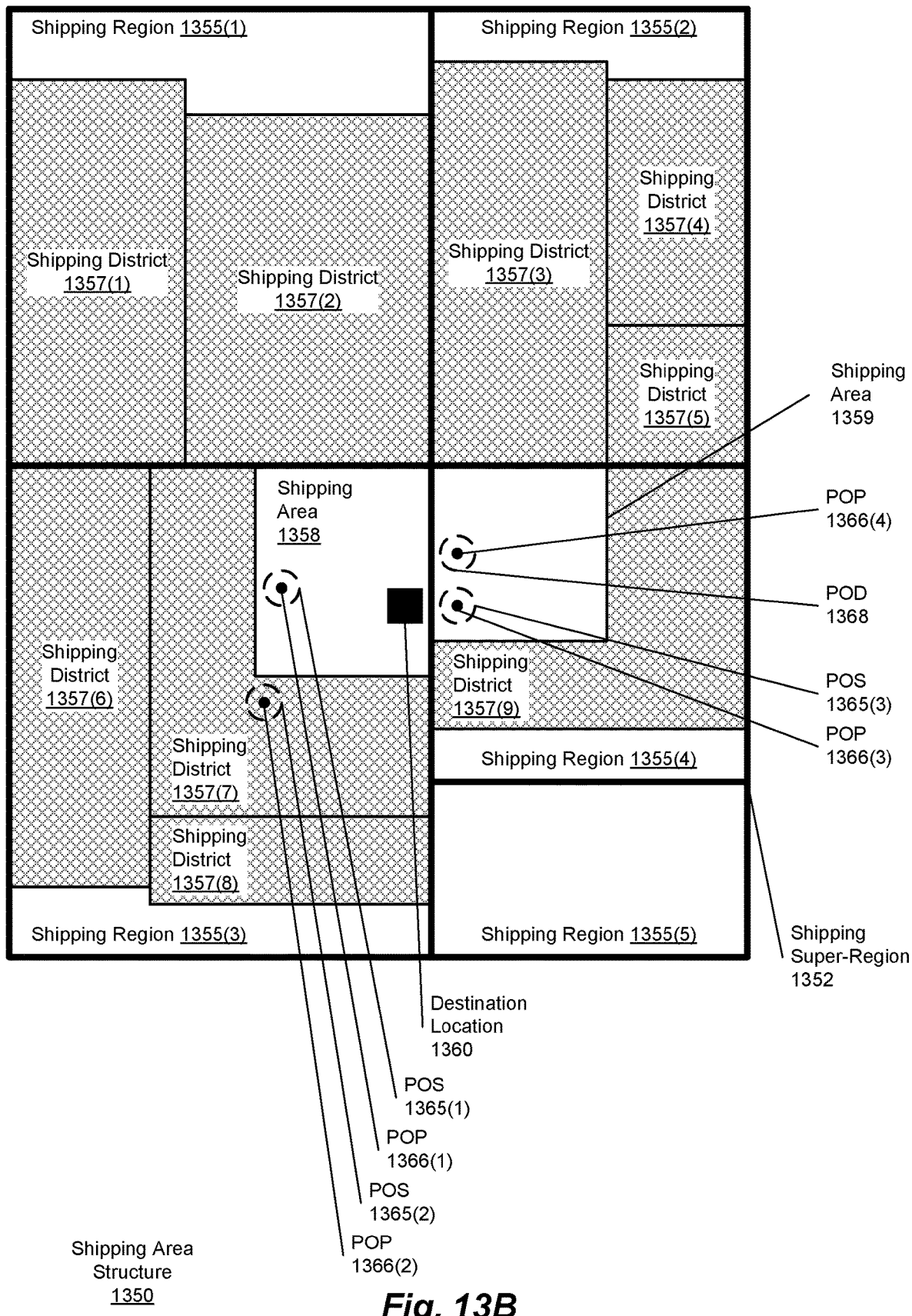
FIG. 13B is a block diagram illustrating an example of a shipping area structure, according to methods and systems such as those disclosed herein.

FIG. 13B is a block diagram illustrating an example of a shipping area structure, according to methods and systems such as those disclosed herein. FIG. 13B thus depicts a shipping area structure 1350, as an example of a structure that can be used in the definition of shipping zones and sub-zones, which represents constraints placed on shipments made within a shipping super-region 1352. As noted below, the structure of shipping area structure 1350 will typically correspond loosely, at the lowest level, to the geography of the physical area represented. However, the overall structure of shipping area structure 1350 is conceptual in nature, and represents, at least in part, decisions made as to the logistical constraints to be enforced in ensuring the fast, effective, and efficient shipping of articles from one location to another. Factors affecting the size and shape of the divisions and subdivisions of shipping area structure 1350 will vary from application to application, and can reflect factors such as fuel cost, emissions, speed of delivery, number and flow of parcels, available infrastructure, applicable governmental divisions/subdivisions, and other such considerations.

In the example presented in FIG. 13B, shipping super-region 1352 includes a number of shipping regions (depicted in FIG. 13B as shipping regions 1355(1)-(5)), which are further divided into shipping districts (depicted in FIG. 13B as shipping districts 1357(1)-(9)). As depicted in FIG. 13B, then, shipping region 1355(1) includes shipping districts 1357(1)-(2); shipping region 1355(2) includes shipping districts 1357(3)-(5); shipping region 1355(3) includes shipping districts 1357(6)-(8); and shipping region 1355(4) includes shipping districts 1357(9), for example. As will be appreciated in light of the present disclosure, each such shipping region can be divided into one or more shipping districts. Within each shipping district are one or more shipping areas (e.g., as depicted in FIG. 13B as shipping area 1358 (within shipping district 1357(7)) and shipping area 1359 (within shipping district 1357(9)).

Also depicted in FIG. 13B is a destination location 1360 (e.g., the physical address of the product's intended recipient). With respect to provision of the desired product, a number of points-of-service (POSs; depicted in FIG. 13B as POSs 1365(1)-(3)) are depicted, at which corresponding points-of-production (POPs; depicted in FIG. 13B as POPs 1366(1)-(4)) are situated. In the manner discussed in connection with FIG. 8, POSs 1365(1)-(3) can, in various embodiments, be shipping locations, delivery locations, manufacturing locations, retail locations, or other locations at which production of a product may be advantageous.

As will be appreciated in light of the present disclosure, the shipping regions, shipping districts, and shipping areas of shipping super-region 1352 serve to identify groups of destinations with greater and greater specificity. Thus, items shipped between shipping regions must go to a super-regional distribution center (not shown) for distribution. Similarly, items shipped from a shipping district to another must go through a regional distribution center (not shown), and an item shipped between shipping areas must go through district-level distribution centers (not shown).

Thus, shipping area structure 1350 can be viewed as giving rise to a hierarchical structure (e.g., in the manner of FIG. 13C, subsequently), where articles sent within a given shipping area are conveyed within that shipping area, while articles destined for a different shipping area are sent through inter-area distribution sites. If the shipping areas of the origin and destination are in different shipping districts, then not only will the article in question transit the inter-area distribution sites for both the origin and destination, but will also need to pass through an inter-district distribution site. Further still, if the two districts are in different shipping regions, the article will not only be forced to transit the appropriate inter-district distribution sites, but will also need to pass through an inter-regional distribution site. Such a hierarchical structure allows for large numbers of articles to flow through such a structure, while maintaining as much locality as is reasonably possible, in view of the fact that an article originating at one location may, in fact, be destined for any other location within the given shipping area structure.

Unfortunately, in such a system, it is possible for an article's origin and destination to be physically close to one another, while being distant from one another in a logistical sense, as a result of being on different sides of an inter-regional boundary, for example. In such a scenario, while it might seem advantageous to ship from a location physically closest to the destination, the selection of such a shipping location may, in fact, cause the shipment to transit several layers of the aforementioned hierarchy of such a system. In fact, any time an article being shipped must cross an additional such boundary, the time and handling involved increases, at least as a result of the need for such articles to transit the corresponding distribution center. An example of such a situation is described below, in connection with POP 1365(3)/POS1366(3) and destination 1360.

However, methods and systems such as those described herein can avoid the delays and inefficiencies produced by such scenarios. By including such considerations in the analysis performed in selecting one or more production nodes, such methods and systems can reduce (or even eliminate) the need for trans-shipments and other handling of the products produced, and so, speed the shipping of the product to its intended destination. That being the case, depending on the structure of shipping area structure 1350, identification and selection of production nodes can be affected by such structures, and so may not always follow an intuitive process.

In the example depicted in FIG. 13B, assuming a loose correspondence to geographical relationships, it will be appreciated that POS 1365(3) (and so POP 1366(3)) are physically closer to destination location 1360. However, POS 1365(1) (and so POP 1366(1)), while at a greater physical distance, is logically closer (from a network standpoint) and/or logistically closer (from the perspective of the parcel or other shipping service involved) because items shipped therefrom are shipped from within shipping area 1358 (from POS 1365(1), in fact). Even in the case of POS 1365(2) (and so POP 1366(2)), an item produced by POP 1366(2) only need to go to the district distribution center (not shown) for shipping district 1357(7). For an item produced by POP 1366(3), however, the item would need to be shipped from POS 1365(3), through the district distribution center for shipping district 1357(9), through the regional distribution center for shipping region 1355(4), through the super-regional distribution center, through the regional distribution center for shipping region 1355(3), through the district distribution center for shipping district 1357(7), and to POS 1365(1) in shipping area 1358. Clearly, the fact of POS 1365(3) (and so POP 1366(3)) physical proximity to the destination location does not necessarily make POP 1366(3) an optimal production location for speed or efficiency in the shipping and delivery of the item in question. Thus, in such scenarios, the implications of shipping area structures such as shipping area structure 1350 need to be taken into account. That said, additional factors (e.g., outages, POP capabilities, and so on) may need to be considered.

Further, the ability to produce one or more products at not only points-of-service, but also at one or more of the various distribution centers provides additional alternatives heretofore unavailable. For example, with respect to bulk shipments, a manufacturer is presently forced to produce a large number of items at a manufacturing location and subsequently ship those items to a large number of destinations (thereby involving a large number of paths through the shipping system, with varying degrees of complication (e.g., inter-regional, inter-district, and inter-area shipping and distribution)). Using methods and systems such as those described herein, such a manufacturer can produce single items (or a small number of items) at each of a large number of POSs that are advantageously located (e.g., in terms of factors such as those mentioned earlier), and so provide the aforementioned benefits.

Further still, customers and manufacturers alike can use methods and systems such as those described herein to produce products at locations advantageous beyond considerations related solely to shipping. When considering pointsof-service, not only should shipping considerations be considered, but also considerations related to the production and shipping of goods along with which such products might be shipped. For example, in the case of printed matter, if such printed matter is to be shipped with other goods, the point-of-service may in fact be the location at which such goods are manufactured, the location at which such goods are shipped, or some other advantageous location with respect to the goods in question. As a more specific example, the production of a greeting card (that includes the desired sentiment, in the manner of the earlier example in this regard) could be produced at the point at which an electronic commerce provider packages other goods for shipment to the recipient. By allowing the customer to select and purchase such goods, while also being able to select a greeting card and include a handwritten sentiment therein, methods and systems such as those described herein allow such a customer to send a gift and accompanying greeting card, for example, by wholly electronic means.

In fact, it can be desirable to produce such items not for shipping, but instead for delivery by a public delivery service (e.g., a local courier), a dedicated/captive delivery service, or the like. For example, returning to FIG. 13B, POP 1366(4) is located at a point-of-delivery (POD) 1368 (which, in fact, can simply be a physical location at which the POP in question (here, POP 1366(4)) is located. A product produced by POP 1366(4) at POD 1368 is then available for delivery by, for example, a local courier.

Figure 13C:
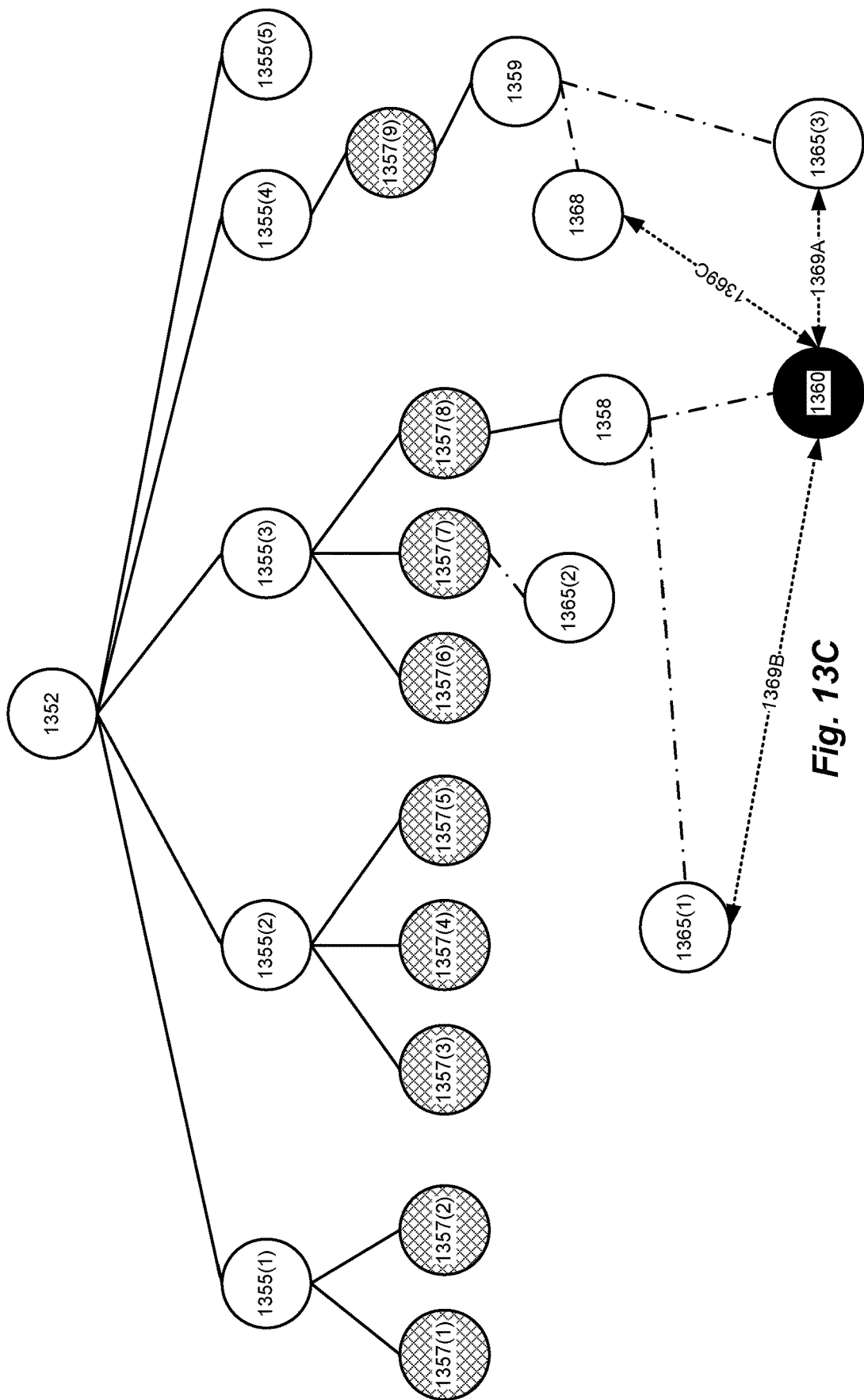
FIG. 13C is a simplified flow diagram illustrating an example of a shipping area structure, according to methods and systems such as those disclosed herein.

FIG. 13C is a simplified flow diagram illustrating an example of a shipping area structure, according to methods and systems such as those disclosed herein. In FIG. 13C, the logical hierarchy of shipping area structure 1350 of FIG. 13B is more evident, and the aforementioned issues (e.g., as relate to the shipping of products to distribution centers when a product's production and destination are in different areas, and the additional delays and handling involved every time such a product crosses such boundaries) can be seen in greater relief. As can be seen in FIG. 13C, while the physical distance between POS 1365(3) and destination 1360 (depicted in FIG. 13C as a physical distance 1369A) is less than the physical distance between POS 1365(1) and destination 1360 (depicted in FIG. 13C as a physical distance 1369B), the logistical distance between these locations is very different. In this regard, it will be appreciated from FIG. 13C that, while a product produced by POP 1366(3) is produced at POS 1365(3) (a location that is physically closer to destination 1360), its logistical route through shipping area structure 1350 is decidedly more circuitous than such a product produced at POS 1365(1) by POS 1366(1), despite distance 1369B being significantly greater than distance 1369A. This is because POS 1365(1), being within shipping area 1358, can ship a product to destination 1360 simply by shipping the product via a district distribution center for shipping area 1358. By contrast, a product produced at POS 1365(3) must transit through distribution centers for 1359, 1357(9), 1355(4), 1352, 1355(3), 1357(8), and 1358, clearly significant in terms of logistical distances (and, as a result, the physical distance such a product would travel in shipping). That said, for a product produced at POD 1368 by POP 1366(4), while the physical distance between POD 1368 and destination 1360 (depicted in FIG. 13C as a physical distance 1369C) is greater than physical distance 1369A, physical distance 1369C is less than physical distance 1369B, and can be more direct in logistical terms than either distance.

Figure 13D:
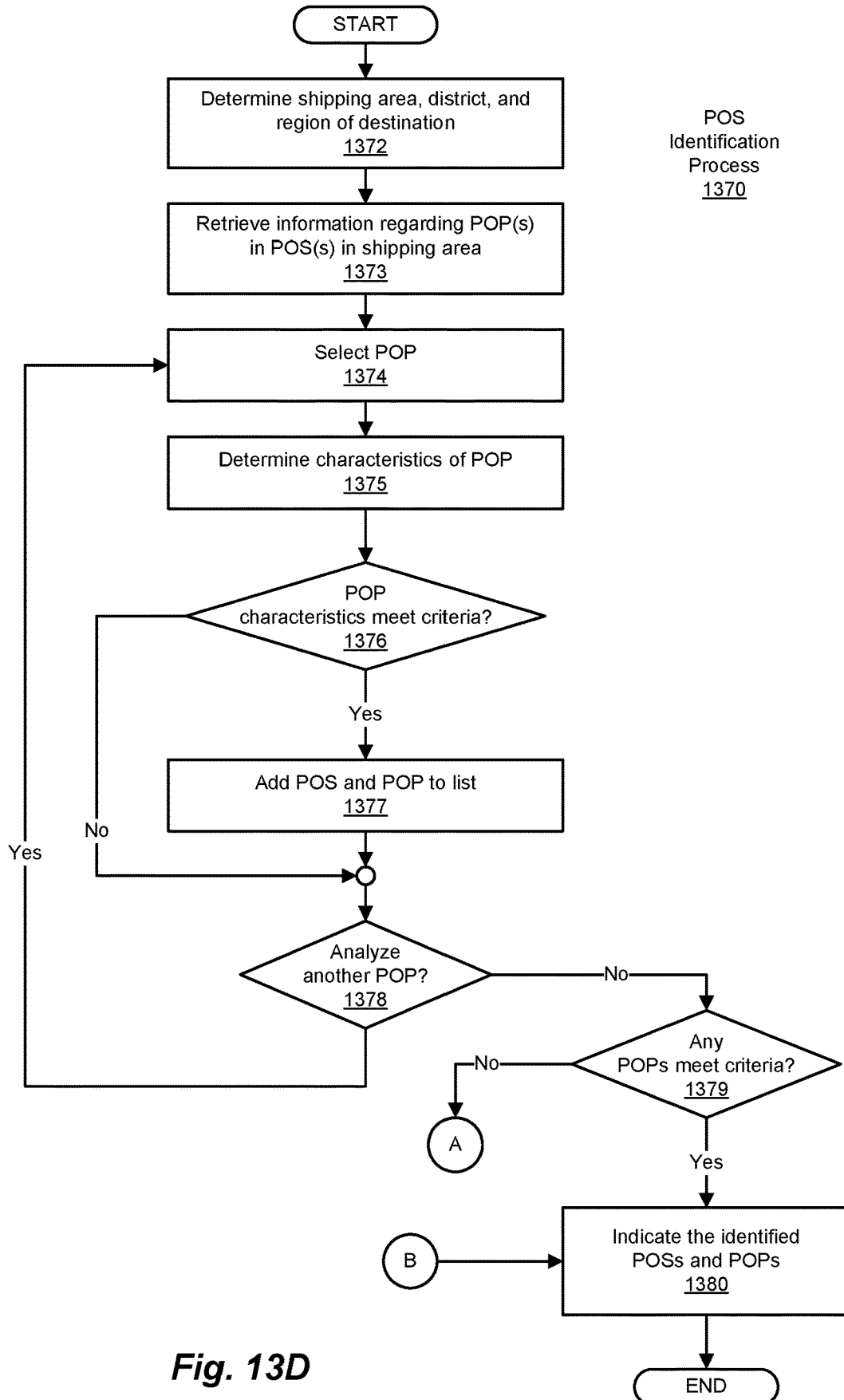
FIGS. 13D, 13E, and 13F are simplified flow diagrams illustrating a simplified flow diagram depicting an example of a production node identification process, according to methods and systems such as those disclosed herein.
Figure 13E:
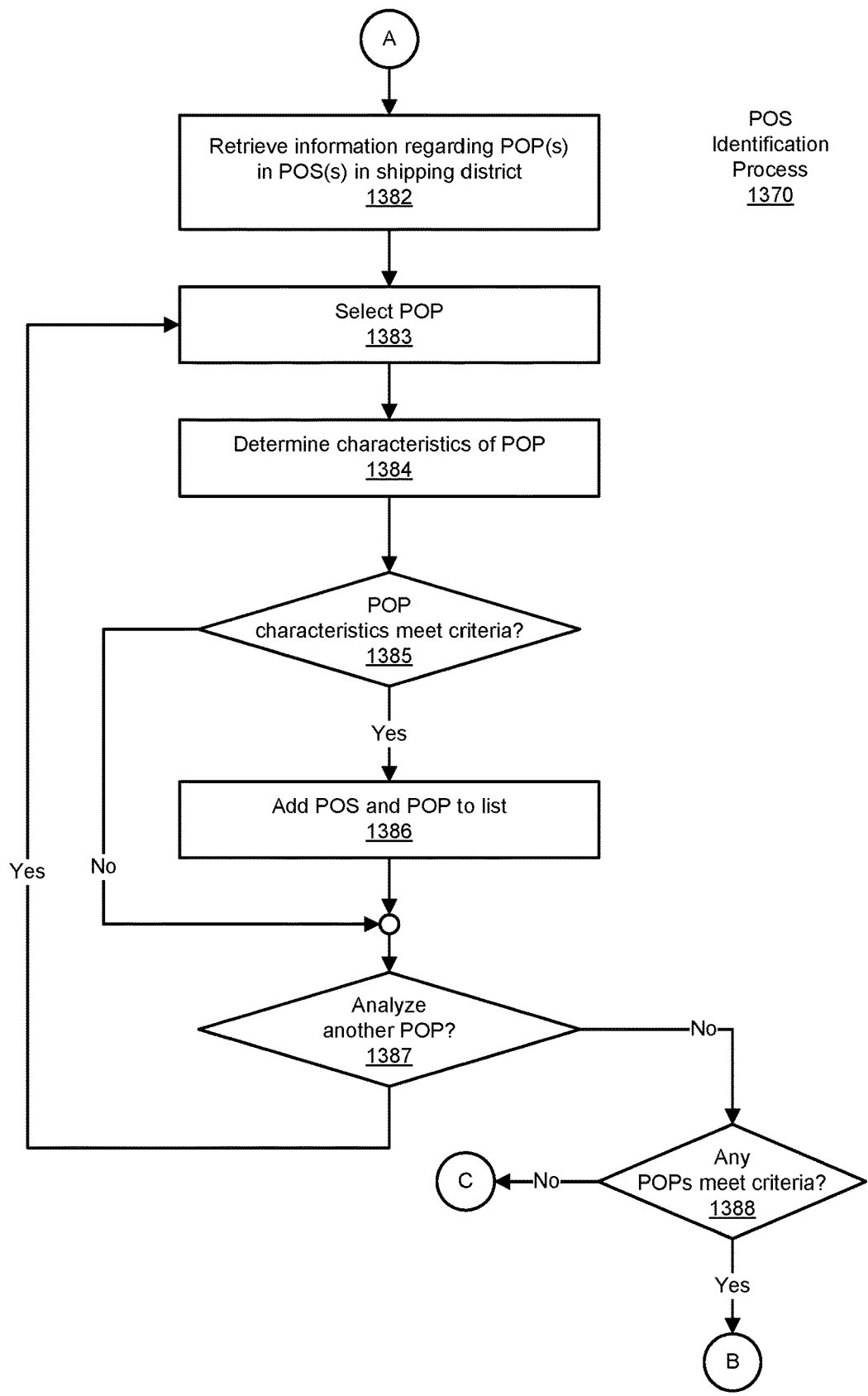
Figure 13F:
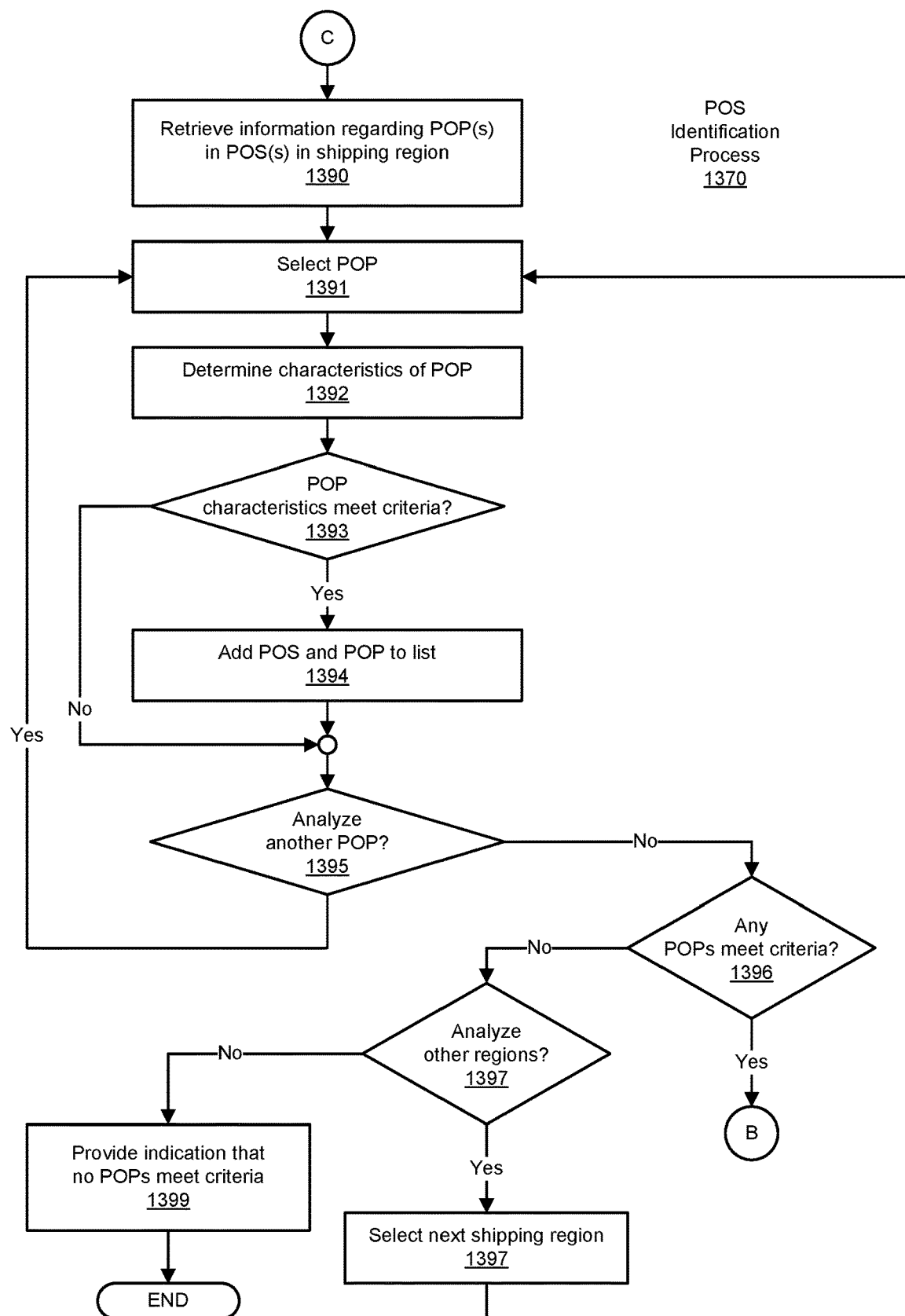

FIGS. 13D, 13E, and 13F illustrate a simplified flow diagram depicting an example of a production node identification process, according to methods and systems such as those disclosed herein. In the example presented, such a process (depicted in FIGS. 13D, 13E, and 13F as a POS identification process 1370) takes account of the hierarchical nature of a shipping area structure such as shipping area structure 1350. As such, POS identification process 1370 starts with POPs (and so, POSs) that involve the least steps between production and delivery of the product, and works out towards POPs (POSs) that progressively involve greater demands with respect to shipping, albeit in view of factors such as outages, POP capabilities, and so on. As noted, an appreciation of how the product will need to be handled, criteria provided by the party wishing to send the product (the sender), and other such constraints are considered in a process such as POS identification process 1370. In the example presented with regard to FIGS. 13D, 13E, and 13F, the rejection of one POP/POS or another on such bases is not shown, for the sake of clarity and brevity.

POS identification process 1370 thus begins with a determination as to the shipping area, district, and region of destination of the product being produced and shipped (1372). Next, information regarding the POP(s) in the POS(s) in the shipping area of the destination is retrieved (e.g., from databases such as location information database 982, by components such as topology information acquisition module 992 and physical locations information module 996 of production node selection module 990, as depicted in FIG. 9) (1373). One of these POPs is then selected for analysis (1374). Notwithstanding the foregoing, as with other processes described herein, the operations above are presented in a particular order. It will be appreciated that such order is not mandatory, and, in fact, certain of these operations can be performed in parallel with one another, and/or in another order, to the same effect.

A determination is then made with regard to, for example, the criteria to be applied (e.g., as might be retrieved from a criteria information database such as criteria information database 984 of FIG. 9) (1375). An analysis of the POP in question is then performed, and a determination made as to whether this POP meets the applicable criteria (1376). In this regard, such criteria facilitate consideration of a number of criteria, including, but not limited to, one or more of the POP's production capabilities, the service provider network(s) to be considered (e.g., one or more of USPS, UPS, FEDEX, and/or other services), the cost of shipping/delivery from the given POP, the resulting carbon footprint/energy costs, bulk shipping considerations (e.g., shipping in bulk from a distribution center may be advantageous), the desired time to deliver the product, ancillary shipping services (e.g., signature requirement, return receipt, and so on). As will be appreciated in light of the present disclosure, methods and systems such as those described herein can also analyze such criteria in combination (e.g., making determinations across multiple carriers, such as considering USPS, FEDEX, UPS, AIRBORNE, DHL, and/or other services when attempting to identify the least expensive manner of shipping). Such considerations, and their many permutations, can result in the need for complex, considered analysis.

If the selected POP's characteristics meet the criteria being applied, information identifying the POP (and the POS in which the POP is situated) are added to a list (or other structure) in which such information is maintained, such that the selection process is able to select from those POPs/POSs listed (1377). Otherwise, one or more other POPs can be analyzed.

To this end, a determination is then made as to whether additional POPs remain to be analyzed (1378). If so, POS identification process 1370 selects the next POP for analysis (1374). Otherwise, a determination is made as to whether any POPs meeting the applicable criteria were identified (1379). If so, an indication is provided that one or more POPs/POSs were identified, as well as information regarding the POP(s)/POS(s) (1380). POS identification process 1370 then concludes.

Alternatively, if none (or an insufficient number) of the POPs analyzed meet the applicable criteria, POS identification process 1370 proceeds to the retrieval of information regarding the POP(s) in the POS(s) in the shipping district of the destination (1382, in FIG. 13E). From the group of POPs in the shipping district of the destination, a POP is selected for analysis (1383). As will be appreciated in light of the present disclosure, because the POPs in the destination's shipping area have already been considered (and, at least potentially, analyzed), there is typically no need to reconsider the POPs in the destination's shipping area.

As before, a determination is made with regard to, for example, the criteria to be applied (e.g., as might be retrieved from a criteria information database such as criteria information database 984 of FIG. 9), in determining whether the characteristics of the selected POP meet the given criteria (1384 and 1385). If the selected POP's characteristics meet the criteria being applied, information identifying the POP (and the POS in which the POP is situated) are added to a list (or other structure) in which such information is maintained, such that the selection process is able to select from those POPs/POSs listed (1386).

A determination is then made as to whether additional POPs in the destination's shipping district remain to be analyzed (1387). If so, POS identification process 1370 selects the next POP for analysis (1383). Otherwise, a determination is made as to whether any POPs meeting the applicable criteria were identified (1388). If so, an indication is provided that one or more POPs/POSs were identified, as well as information regarding the POP(s)/POS(s) (1380, in FIG. 13D). POS identification process 1370 then concludes.

Alternatively, if none (or an insufficient number) of the POPs analyzed to this point meet the applicable criteria, POS identification process 1370 proceeds to the retrieval of information regarding the POP(s) in the POS(s) in the shipping region of the destination (1390, in FIG. 13F). From the group of POPs in the shipping region of the destination, a POP is selected for analysis (1391). As will be appreciated in light of the present disclosure, because the POPs in the destination's shipping district have already been considered (and, at least potentially, analyzed), there is typically no need to reconsider the POPs in the destination's shipping district.

As before, a determination is made with regard to, for example, the criteria to be applied (e.g., as might be retrieved from a criteria information database such as criteria information database 984 of FIG. 9), in determining whether the characteristics of the selected POP meet the given criteria (1392 and 1393). If the selected POP's characteristics meet the criteria being applied, information identifying the POP (and the POS in which the POP is situated) are added to a list (or other structure) in which such information is maintained, such that the selection process is able to select from those POPs/POSs listed (1394).

A determination is then made as to whether additional POPs in the destination's shipping district remain to be analyzed (1395). If so, POS identification process 1370 selects the next POP for analysis (1391). Otherwise, a determination is made as to whether any POPs meeting the applicable criteria were identified (1396). If so, an indication is provided that one or more POPs/POSs were identified, as well as information regarding the POP(s)/POS(s) (1380, in FIG. 13D). POS identification process 1370 then concludes.

Alternatively, if none (or an insufficient number) of the POPs analyzed to this point meet the applicable criteria, POS identification process 1370 proceeds to a determination as to whether POPs in other regions within the super-region should be analyzed (1397). If other regions within the super-region remain to be analyzed, the next such region is selected (1397), and POS identification process 1370 proceeds to select a POP therein (1391). As before, if one or more POPs/POSs (or a sufficient number thereof) were identified, POS identification process 1370 makes the appropriate indication (again, by proceeding to 1380, in FIG. 13D). Otherwise, no (or an insufficient number of) POPs were identified as a result of performing POS identification process 1370. That being the case, an indication to that effect is provided (1399). POS identification process 1370 then concludes.

Figure 14A:
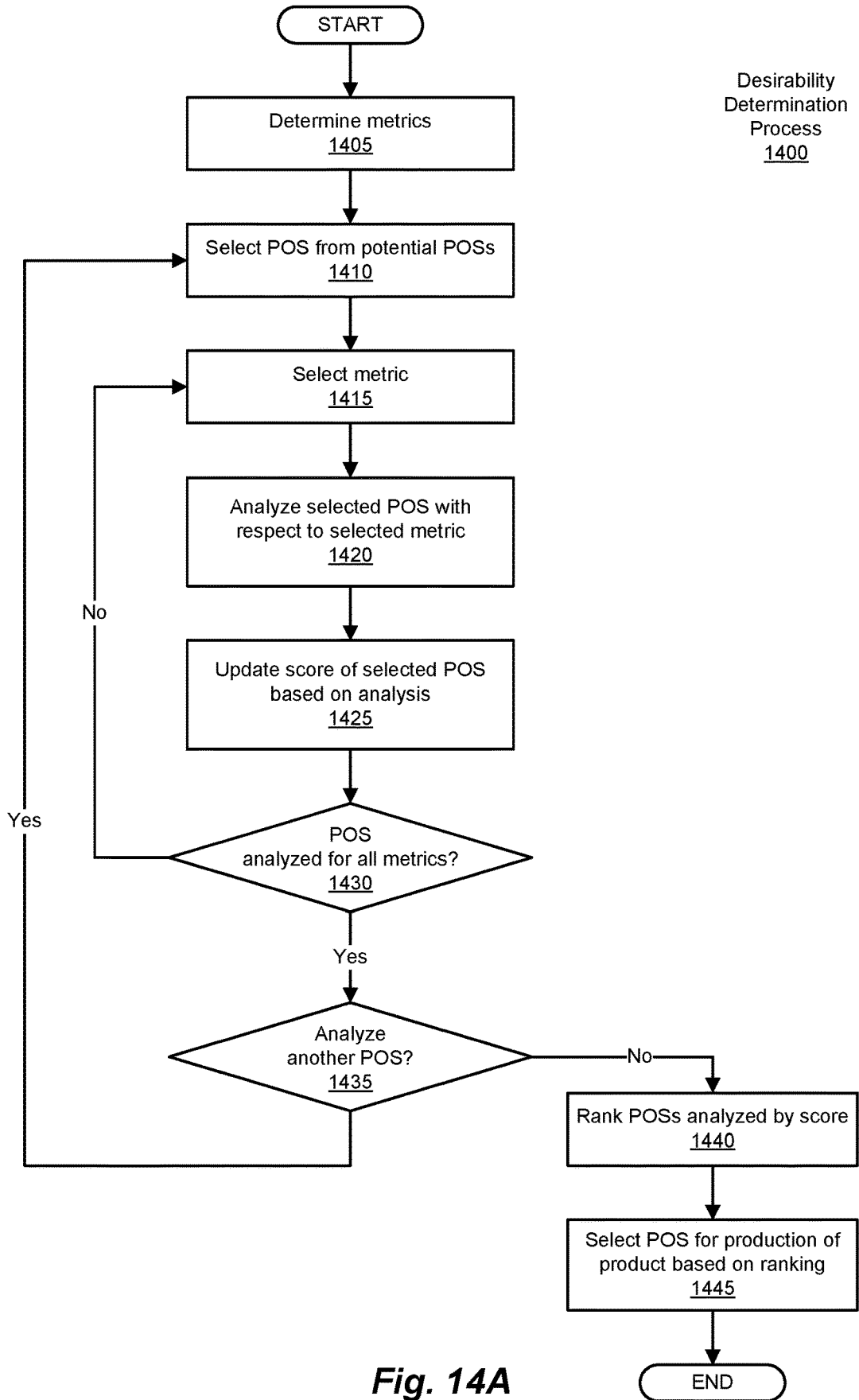
FIG. 14A is a simplified flow diagram illustrating an example of a desirability determination process, according to methods and systems such as those disclosed herein.

FIG. 14A is a simplified flow diagram illustrating an example of a desirability determination process, according to methods and systems such as those disclosed herein. As in the examples described in connection with FIGS. 13B and 13C, a distance between a given production node and destination can be viewed in terms of a number of measures. For example, as noted, physical distance and logistical distances can be meaningful metrics. As also noted, other metrics can affect the decision of where a given product will be produced. Other such considerations can include special shipping arrangements (on a per-distribution center basis, by carrier, the use of multiple carriers, bulk rates, and the like), carbon footprint of the shipping method (e.g., individual delivery by vehicle, bulk delivery by ground transport, shipping by air, and so on), cost, the time involved in shipping/delivery, inventory of materials on hand, and other such factors. With regard to such considerations, a process for determining the overall desirability of a given production node relative to the intended destination can be determined.

FIG. 14A thus depicts a desirability determination process 1400. Desirability determination process 1400 begins with a determination as to the metric(s) to be used in analyzing one or more production nodes under consideration. It will be appreciated that the production node(s) under consideration can include all such production nodes, or some subset thereof (1405). For example, such analysis can be limited to only those production nodes in a given country, state, province, geographical area, or other such subdivision. Further, in a situation where certain items might be affected, laws of various jurisdictions in which the product might be produced can also be considered.

Figure 14B:
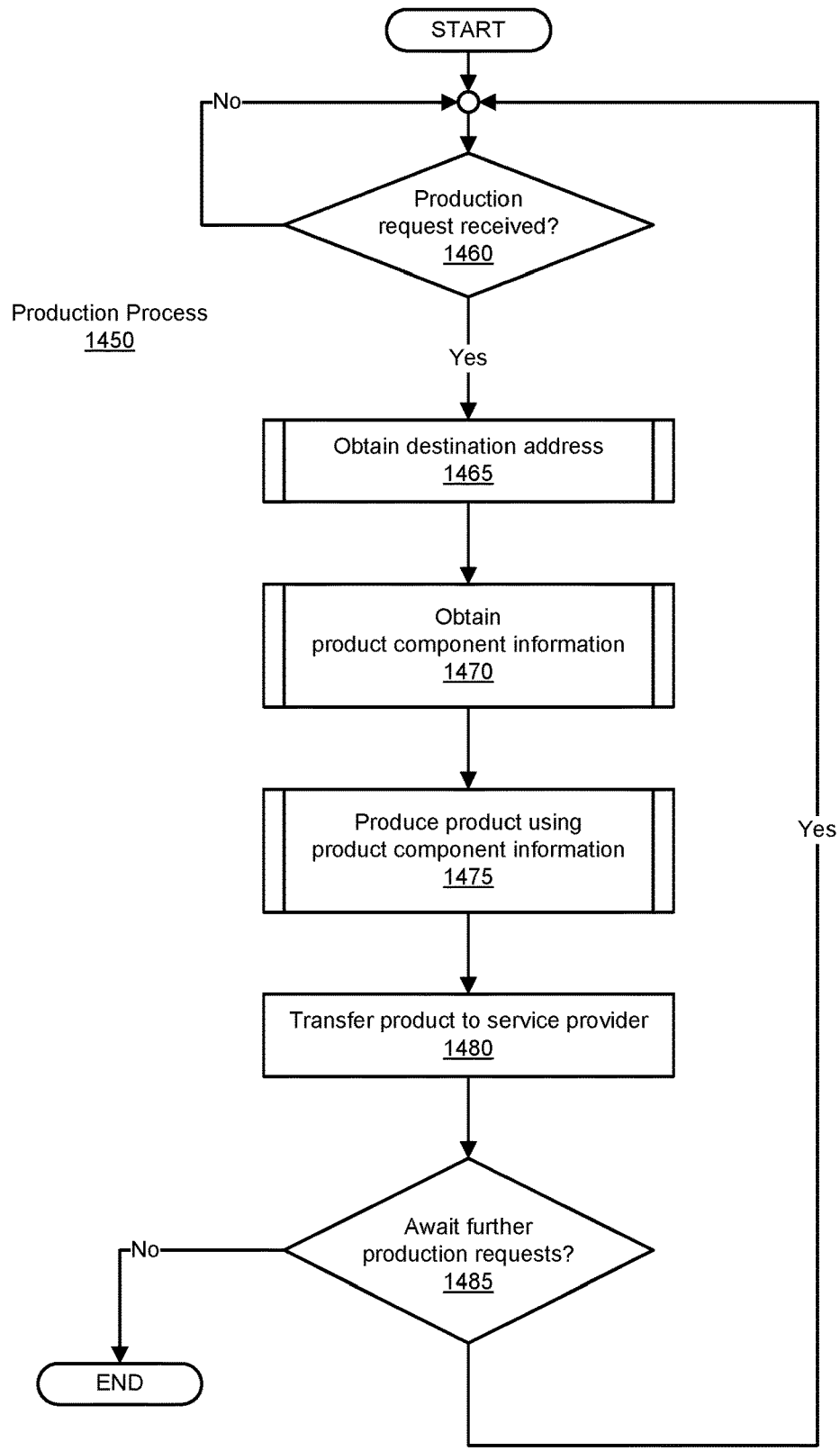
FIG. 14B is a simplified flow diagram illustrating an example of a production process, according to methods and systems such as those disclosed herein.

The metrics with which the POSs are to be analyzed having been selected, a POS is selected from the potential POSs (1410). One of the metrics is then selected (1415). The selected POS is then analyzed with respect to the selected metric (1420). Desirability determination process 1400 maintains a score for each POS analyzed, with regard to the metrics against which each such POS is analyzed. Thus, once the selected POS is analyzed with respect to the selected metric, its score for that selected metric is updated, based on the analysis (1425). A determination is then made as to whether the selected POS has been analyzed for the metric(s) in question (1430). If the selected POS still needs to be analyzed with respect to one or more metrics, desirability determination process 1400 loops to selection of the next metric (1415). Alternatively, if the selected POS has been analyzed with respect to the desired metrics, a determination is made as to whether further POSs remain to be analyzed (1435). If further POSs remain to be analyzed, desirability determination process 1400 loops to selection of the next POS (1410). Alternatively, if the POSs in question have all been analyzed, desirability determination process 1400 proceeds to the ranking of the POSs analyzed by their score (1440). A POS can then be selected for production of product based on the rankings (1445). Desirability determination process 1400 then concludes FIG. 14B is a simplified flow diagram illustrating an example of a production process, according to methods and systems such as those disclosed herein. FIG. 14B thus illustrates a production process 1450. Production process 1450 begins with a determination as to whether a production request has been received at the given production node (1460). A process for obtaining the physical destination (e.g., the physical address for the recipient) of the product being produced is then performed (1465). As will be appreciated in light of the present disclosure, such information can be contained in the request, or can be obtained by some other method. An example of a process for obtaining a physical destination is described in greater detail in connection with FIG. 15, subsequently.

A process for obtaining product component information is then performed (1470). An example of a process for obtaining product component information is presented in connection with FIG. 16, subsequently. Having received the requisite product component information (as well as recipient address information), production process 1450 then performs a process for the production of the product using the product component information thus received (1475). An example of product production using product component information is described in greater detail in connection with FIG. 17, subsequently.

The desired product having been produced, the product is transferred to a service provider at the point-of-service (POS) (1480). Further, at this juncture, the product having been produced can be tagged, or associated with a tag, at the point of production, in order to allow for identification as being associated with a particular order. The production node in question then makes a determination as to whether or not to await further production requests (1485). Such a determination might be made, for example, in a situation where production materials might be needed to replenish stores thereof at the production node, based on the need for maintenance of the production node, and as a result of other such considerations. If the production node will not await further production requests, the process concludes. If the production node will return to awaiting further production requests, production process 1450 loops and awaits such further production requests (1475).

Figure 15:
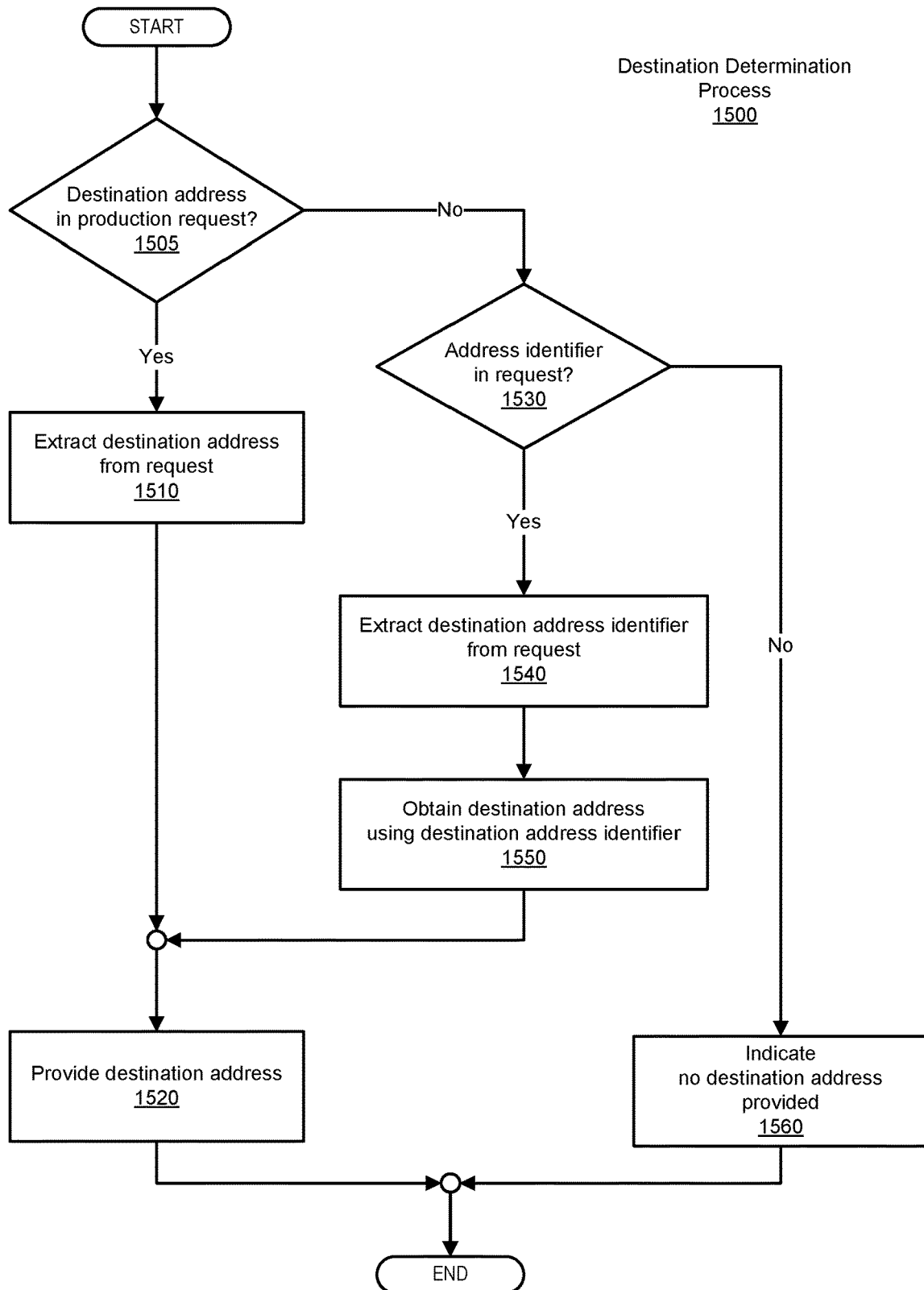
FIG. 15 is a simplified flow diagram illustrating an example of a process for determining the address of a destination of a product to be produced, according to methods and systems such as those disclosed herein.

FIG. 15 is a simplified flow diagram illustrating an example of a process for determining the destination (e.g., the address of a recipient) of a product to be produced, according to methods and systems such as those disclosed herein. Destination determination process 1500 begins with a determination as to whether the destination (in this example, the given recipient's address) is in the request received (1505). If the recipient address is in the request received, the recipient address is extracted from the request (1510). The now-extracted recipient address is then provided (e.g., to a production node selection module) (1520). The process then concludes.

In the case in which the recipient's address is not included in the request, a determination is made as to whether an address identifier is included in the request received (1530). Such an address identifier can be used to simplify a user's interactions with a customization client, to reduce the communications bandwidth consumed in conveying such information, and for other such reasons. Recipient address information, address identifiers, and the like can be maintained, for example, in a user information database of a user information server. In the case in which an address identifier for the recipient's address is included in the request, the recipient address identifier in question can be extracted from the request (1540), and the recipient address obtained using the recipient address identifier (1550). Such retrieval can be performed using, as noted, such a recipient address identifier by using the identifier to retrieve the recipient's address from a user information database.

Having thus obtained the recipient address, the recipient address is provided to the production node, for use in the delivery of the product produced (1520). The process then concludes. In the alternative, if the recipient address cannot be determined (1500 and 1530), an indication is made that no recipient address has been provided (1560). Alternatively, such a situation could simply be the result of an error, in which case the service provider could contact the sender and/or the production node would not confirm production of the product, among other such possibilities. In any event, the process then concludes.

Figure 16:
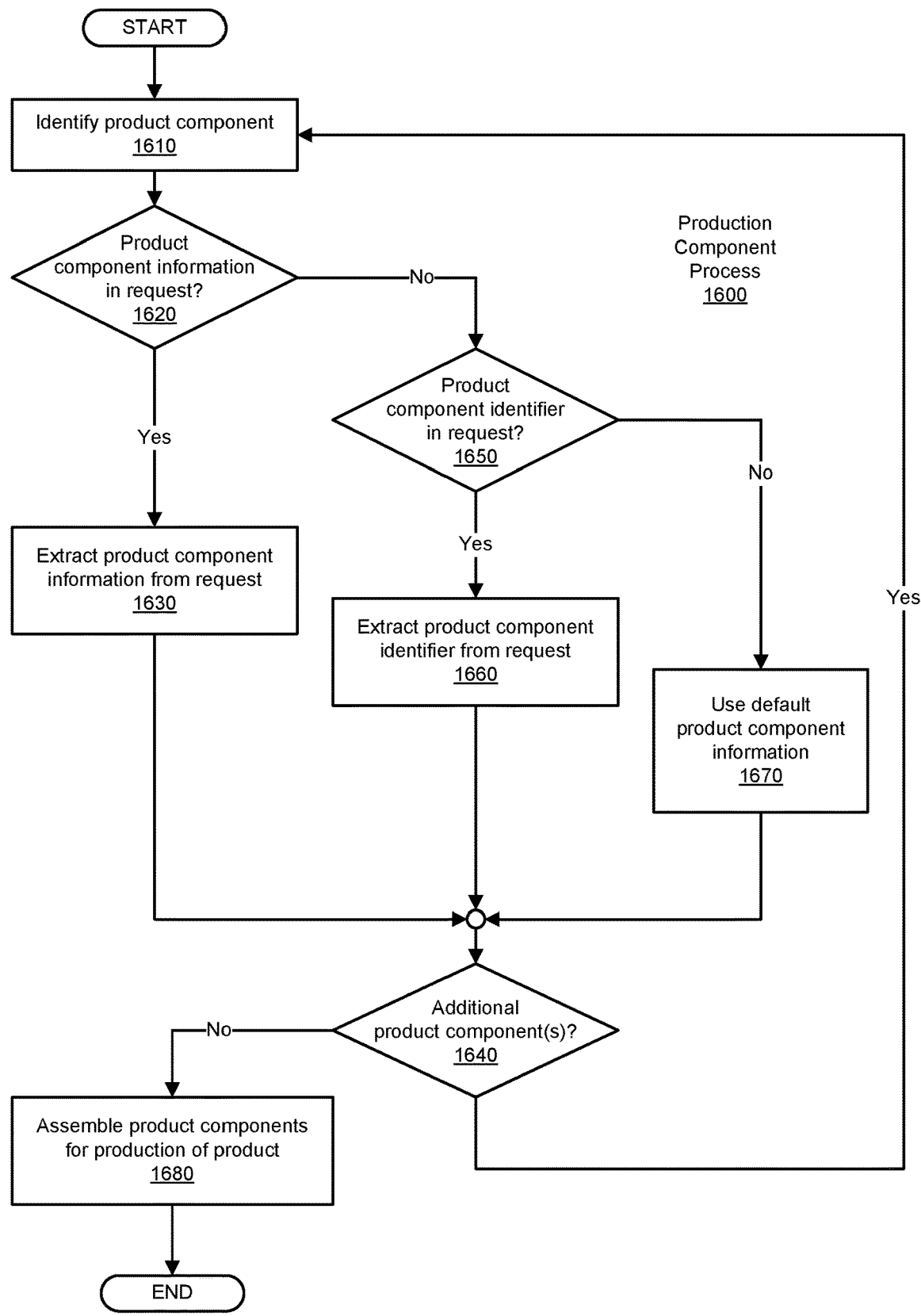
FIG. 16 is a simplified flow diagram illustrating an example of a production component process, according to methods and systems such as those disclosed herein.

FIG. 16 is a simplified flow diagram illustrating an example of a production component process, according to methods and systems such as those disclosed herein. FIG. 16 thus illustrates a production component process 1600. As will be appreciated in light of the present disclosure, product components comprehend products, portions of product, features of products, and customizations to one or more of the foregoing, and so can be treated as being in a form ready for production thereof. To that end, product component process 1600 begins with the identification of a given one of a product's product components (1610). A determination is then made as to whether information regarding the product component (product component information) can be found in the production request (1620). If the product component information is included in the production request, the production node extracts such product component information from the production request (1630). A determination is then made as to whether additional product components remain to be obtained (1640). So long as product components remain, product component process 1600 loops to the identification of the next product component (1610).

Alternatively, if the requisite product component information is not in the production request, a determination is then made as to whether a product component identifier is in the production request (1650). If a product component identifier is in the production request, the product component identifier is extracted from the production request (1660). As before, a determination is then made as to whether additional product components remain to be processed (1640). In the case in which the information for further production components remains to be processed, product component process 1600 loops to the identification of the next product component (1610).

In the case in which product component information is not included in the production request, nor is a product component identifier, the production node performing product component process 1600 can employ default product component information for the product component in question (1670). Such a default action can be examining information in a user information database or the like, for example. As before, a determination is made as to whether product component information for additional product components remains to be processed (1640). Also as before, if such additional product components remain, the process loops to the identification of the next product components (1610). Alternatively, if no further product components remain (a possibility in any of the three flow paths depicted as part of product component process 1600), product component process 1600 proceeds to the assembly of product components in a form appropriate to the production of the given product (1680). The process then concludes.

Figure 17:
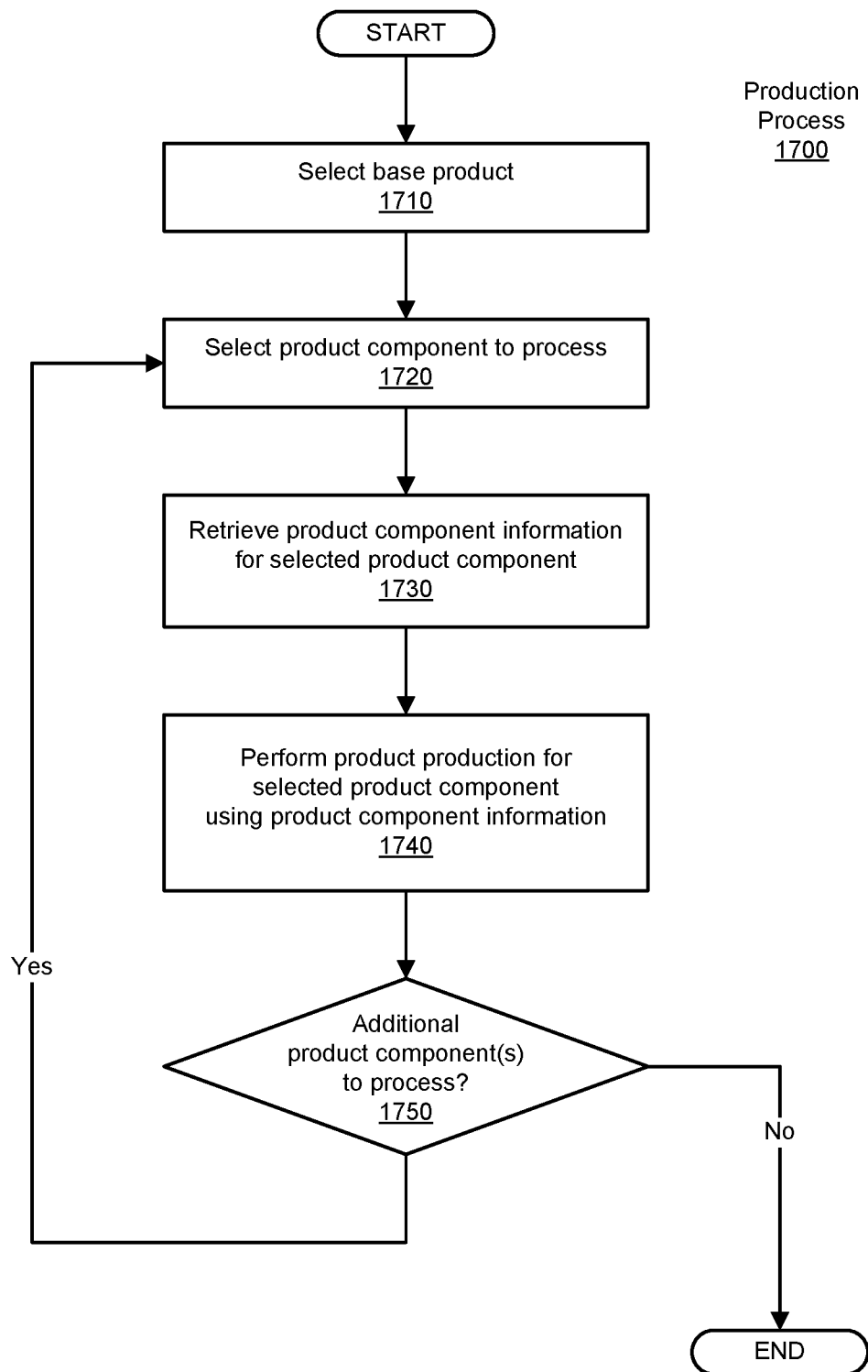
FIG. 17 is a simplified flow diagram illustrating an example of a production process, according to methods and systems such as those disclosed herein.

FIG. 17 is a simplified flow diagram illustrating an example of a production process, according to methods and systems such as those disclosed herein. FIG. 17 thus illustrates a production process 1700. Production process 1700 results in the production of the given product using the product component information obtained in product component process 1600. Production process 1700 begins with a selection of the base product to be produced (1710). A product component of the product being produced is then selected for processing (1720). Product component information for the selected product is then retrieved (1730). Product production operations are then performed with the selected product component using the product component information thus retrieved (1740). A determination is then made as to whether additional product components remain to be processed (1750). In the case in which additional product components are to be processed as part of the production of the given product, production process 1700 loops to the selection of the next product component for processing (1720). Once the requisite product components have been processed, the product in question will have been produced, and will be ready for transfer to the service provider. The process thus concludes.

As will be appreciated in light of the present disclosure, processes such as those described above are merely exemplary in nature, and the aforementioned alternatives, as well as others, will be apparent in light of the present disclosure, and are intended to come within the scope thereof.

An Example Computing and Network Environment

As shown above, the systems described herein can be implemented using a variety of computer systems and networks. Examples of such computing and network environments are described below with reference to FIGS. 18 and 19.

Figure 18:
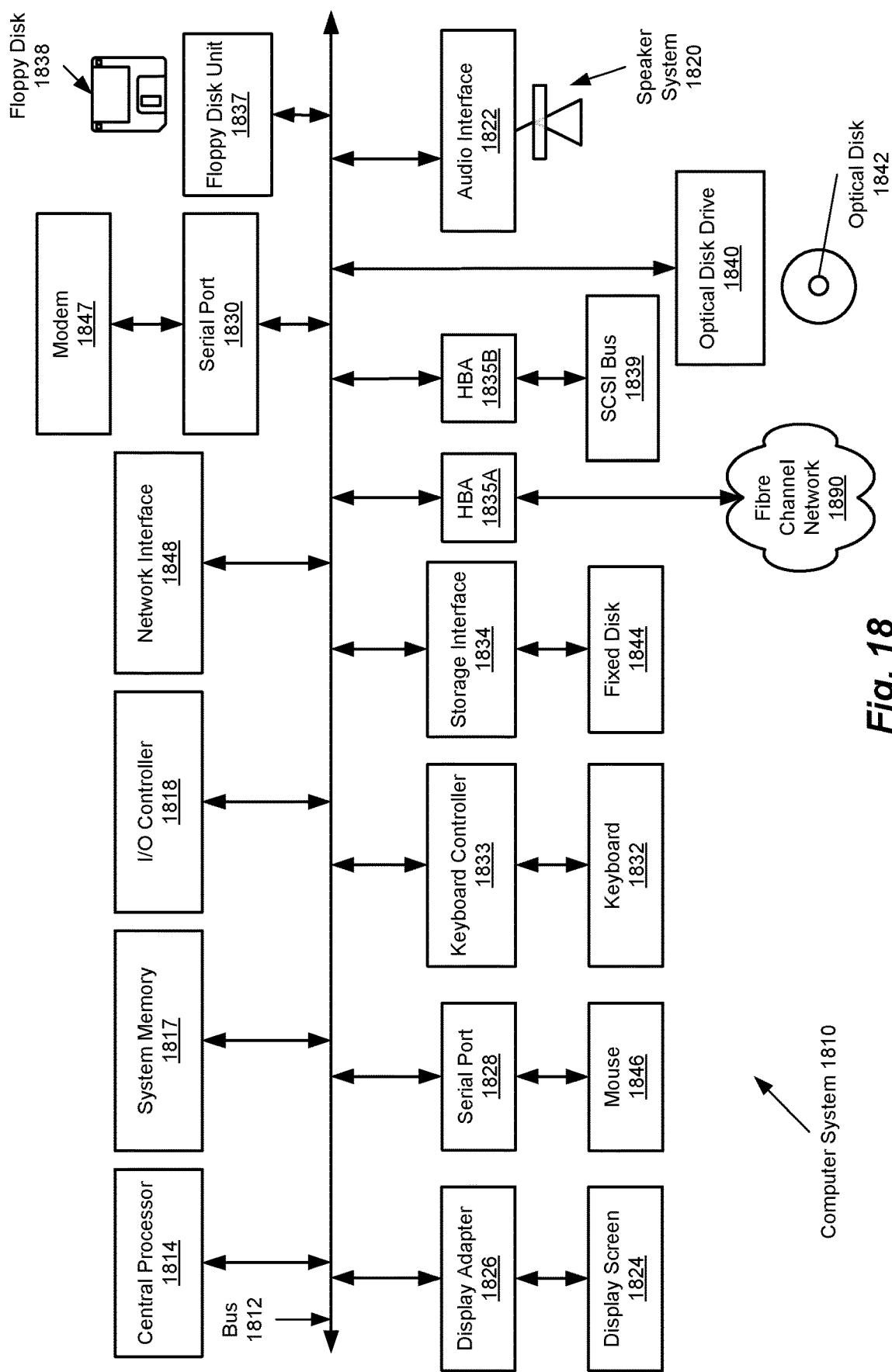
FIG. 18 is a block diagram depicting a computer system suitable for implementing aspects of systems according to embodiments of systems such as those disclosed herein.

FIG. 18 depicts a block diagram of a computer system 1810 suitable for implementing aspects of the systems described herein, and the like. Computer system 1810 includes a bus 1812 which interconnects major subsystems of computer system 1810, such as a central processor 1814, a system memory 1817 (typically RAM, but which may also include ROM, flash RAM, or the like), an input/output controller 1818, an external audio device, such as a speaker system 1820 via an audio output interface 1822, an external device, such as a display screen 1824 via display adapter 1826, serial ports 1828 and 1830, a keyboard 1832 (interfaced with a keyboard controller 1833), a storage interface 1834, a floppy disk drive 1837 operative to receive a floppy disk 1838, a host bus adapter (HBA) interface card 1835A operative to connect with a Fibre Channel network 1890, a host bus adapter (HBA) interface card 1835B operative to connect to a SCSI bus 1839, and an optical disk drive 1840 operative to receive an optical disk 1842. Also included are a mouse 1846 (or other point-and-click device, coupled to bus 1812 via serial port 1828), a modem 1847 (coupled to bus 1812 via serial port 1830), and a network interface 1848 (coupled directly to bus 1812).

Bus 1812 allows data communication between central processor 1814 and system memory 1817, which may include read-only memory (ROM) or flash memory (neither shown), and random access memory (RAM) (not shown), as previously noted. RAM is generally the main memory into which the operating system and application programs are loaded. The ROM or flash memory can contain, among other code, the Basic Input-Output System (BIOS) which controls basic hardware operation such as the interaction with peripheral components. Applications resident with computer system 1810 are generally stored on and accessed from a computer-readable storage medium, such as a hard disk drive (e.g., fixed disk 1844), an optical drive (e.g., optical drive 1840), a floppy disk unit 1837, or other computer-readable storage medium.

Storage interface 1834, as with the other storage interfaces of computer system 1810, can connect to a standard computer-readable medium for storage and/or retrieval of information, such as a fixed disk drive 1844. Fixed disk drive 1844 may be a part of computer system 1810 or may be separate and accessed through other interface systems. Modem 1847 may provide a direct connection to a remote server via a telephone link or to the Internet via an internet service provider (ISP). Network interface 1848 may provide a direct connection to a remote server via a direct network link to the Internet via a point of presence. Network interface 1848 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 18 need not be present to practice the systems described herein. The devices and subsystems can be interconnected in different ways from that shown in FIG. 18. The operation of a computer system such as that shown in FIG. 18 is readily known in the art and is not discussed in detail in this application. Code to implement the modules of the systems described herein can be stored in computer-readable storage media such as one or more of system memory 1817, fixed disk 1844, optical disk 1842, or floppy disk 1838. The operating system provided on computer system 1810 may be MS-WINDOWS®, UNIX®, Linux®, or other operating system.

Further, and as will be appreciated in light of the present disclosure, each of the operations described herein may be executed by a module (e.g., a software module) or a portion of a module, or a computer system user. Thus, the above-described method, the operations thereof and modules therefor may be executed on a computer system configured to execute the operations of the method and/or may be executed from computer-readable storage media. The method may be embodied in a machine-readable and/or computer-readable storage medium for configuring a computer system to execute the method. Thus, the software modules may be stored within and/or transmitted to a computer system memory to configure the computer system to perform the functions of the module.

The software modules described herein may be received by a computer system, for example, from computer-readable storage media. Such computer readable storage media may be permanently, removably or remotely coupled to the computer system. Computer-readable storage media may non-exclusively include, for example, any number of the following: magnetic storage media (including disk and tape storage media); optical storage media such as compact disk media (e.g., CD ROM, CD R, etc.) and digital video disk storage media; nonvolatile memory storage memory including semiconductor-based memory units such as FLASH memory, EEPROM, EPROM, ROM or application specific integrated circuits; and volatile storage media (including registers, buffers or caches, main memory, RAM, etc.). In a UNIX-based embodiment, the software modules may be embodied in a file, which may be a device, a terminal, a local or remote file, a socket, or other such element. Other new and various types of computer-readable storage media may also be used to store the software modules discussed herein.

Many other devices or subsystems (not shown) may be connected in a similar manner (e.g., bar code readers, document scanners, digital cameras and so on). Conversely, it is not necessary for all of the devices shown in FIG. 18 to be present to practice the present invention. The devices and subsystems may be interconnected in different ways from that shown in FIG. 18. The operation of a computer system such as that shown in FIG. 18 is readily known in the art and is not discussed in detail in this application. Code to implement the present invention may be stored in computer-readable storage media such as one or more of system memory 1816, fixed disk 1844, CD-ROM 1842, or floppy disk 1838. Additionally, computer system 1810 may be any kind of computing device, and so includes personal data assistants (PDAs), network appliance, X-window terminal or other such computing device. Computer system 1810 also supports a number of Internet access tools, including, for example, an HTTP-compliant web browser having a JavaScript interpreter, such as FIREFOX, INTERNET EXPLORER, and the like.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 19:
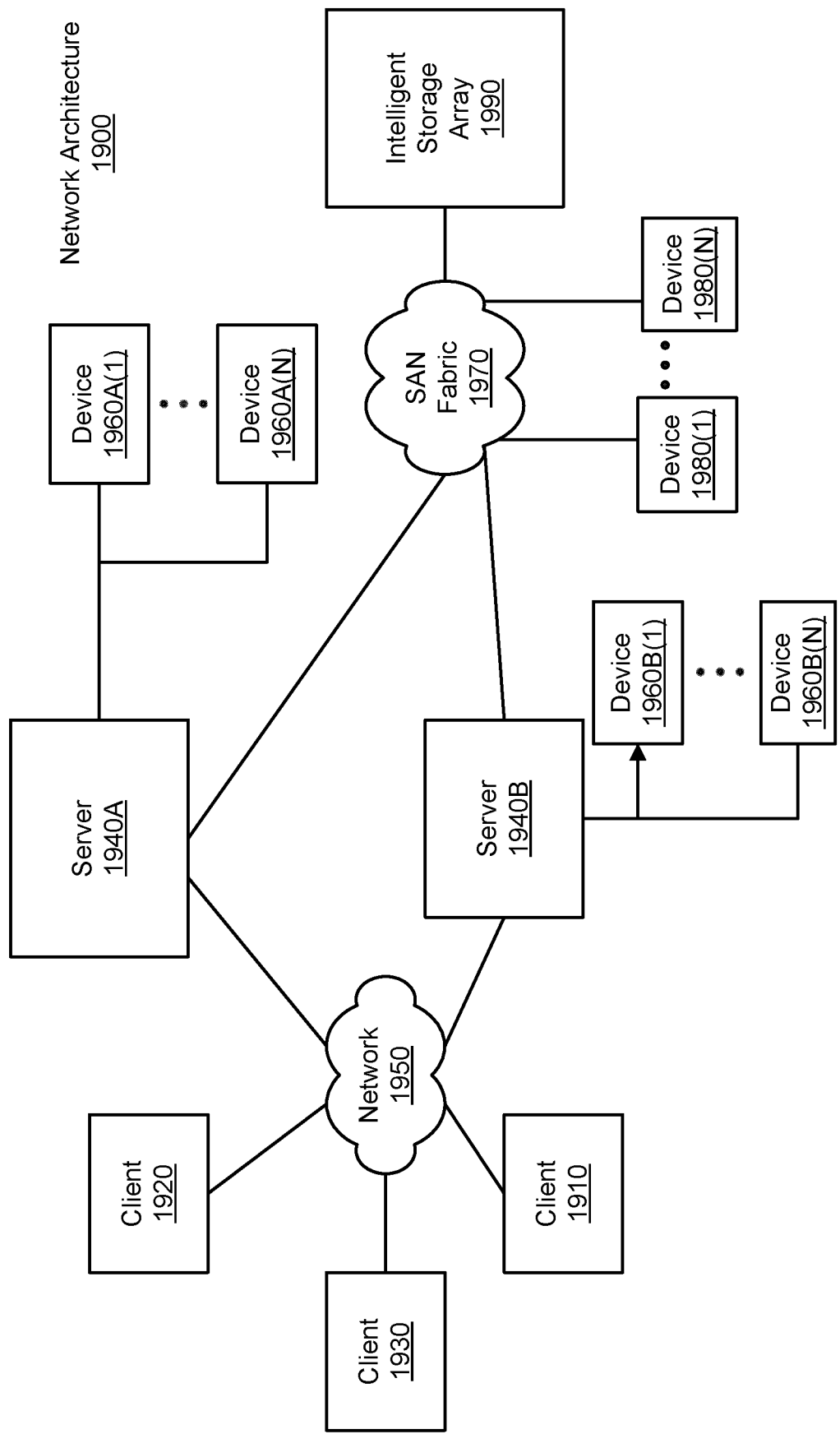
FIG. 19 is a block diagram depicting a network architecture suitable for implementing aspects of systems according to embodiments of systems such as those disclosed herein.

FIG. 19 is a block diagram depicting a network architecture 1900 in which client systems 1910, 1920 and 1930, as well as storage servers 1940A and 1940B (any of which can be implemented using computer system 1910), are coupled to a network 1950. Storage server 1940A is further depicted as having storage devices 1960A(1)-(N) directly attached, and storage server 1940B is depicted with storage devices 1960B(1)-(N) directly attached. Storage servers 1940A and 1940B are also connected to a SAN fabric 1970, although connection to a storage area network is not required for operation. SAN fabric 1970 supports access to storage devices 1980(1)-(N) by storage servers 1940A and 1940B, and so by client systems 1910, 1920 and 1930 via network 1950. Intelligent storage array 1990 is also shown as an example of a specific storage device accessible via SAN fabric 1970.

With reference to computer system 1810, modem 1847, network interface 1848 or some other method can be used to provide connectivity from each of client computer systems 1910, 1920 and 1930 to network 1950. Client systems 1910, 1920 and 1930 are able to access information on storage server 1940A or 1940B using, for example, a web browser or other client software (not shown). Such a client allows client systems 1910, 1920 and 1930 to access data hosted by storage server 1940A or 1940B or one of storage devices 1960A(1)-(N), 1960B(1)-(N), 1980(1)-(N) or intelligent storage array 1990. FIG. 18 depicts the use of a network such as the Internet for exchanging data, but the systems described herein are not limited to the Internet or any particular network-based environment.

The foregoing described embodiments wherein the different components are contained within different other components (e.g., the various elements shown as components of computer system 1810) are merely intended to serve as examples. It is to be understood that such depicted architectures are such, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

Other Embodiments

The systems described herein are well adapted to attain the advantages mentioned as well as others inherent therein. While such systems have been depicted, described, and are defined by reference to particular descriptions, such references do not imply a limitation on the claims, and no such limitation is to be inferred. The systems described herein are capable of considerable modification, alteration, and equivalents in form and function, as will occur to those ordinarily skilled in the pertinent arts in considering the present disclosure. The depicted and described embodiments are examples only, and are in no way exhaustive of the scope of the claims.

The foregoing detailed description has set forth various embodiments of the systems described herein via the use of block diagrams, flowcharts, and examples. It will be understood by those within the art that each block diagram component, flowchart step, operation and/or component illustrated by the use of examples can be implemented (individually and/or collectively) by a wide range of hardware, software, firmware, or any combination thereof.

The systems described herein have been described in the context of fully functional computer systems; however, those skilled in the art will appreciate that the systems described herein are capable of being distributed as a program product in a variety of forms, and that the systems described herein apply equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative and should not be taken to be limiting. As will be appreciated in light of the present disclosure, other embodiments are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the claims. Variations and modifications of the embodiments disclosed herein can be made based on the description set forth herein, without departing from the scope of the claims, giving full cognizance to equivalents thereto in all respects.

Although the systems described herein have been described in connection with several embodiments, these embodiments and their descriptions are not intended to be limited to the specific forms set forth herein. On the contrary, it is intended that such embodiments address such alternatives, modifications, and equivalents as can be reasonably included within the scope of the appended claims.

What is claimed is:

1. A method, implemented in a computer system, comprising:
    obtaining product information, wherein
        the product information is configured to facilitate production of a product, and
        the product is a greeting card;
    selecting a production node from a plurality of production nodes, wherein
        each production node of the plurality of production nodes is located at a corresponding point of service of a plurality of points of service,
        the selecting comprises
            determining a destination physical location of a destination of the product,
            determining a destination location within a shipping area structure, using the destination physical location, wherein
                the shipping area structure is a hierarchical structure, and
            identifying the production node,
        the identifying comprises
            determining one or more production criteria,
            determining a point-of-service physical location for each point of service of the corresponding points of service,
            determining a corresponding point-of-service physical distance for each production node of the plurality of production nodes, wherein
                the corresponding point-of-service physical distance is defined by the destination physical location and the point-of-service physical location of the each production node,
            determining a point-of-service location for the each point of service of the corresponding points of service, within the shipping area structure, wherein
                the point-of-service location is determined using the point-of-service physical location of the each production node,
            determining a corresponding point-of-service logistical distance for the each production node, wherein
                the corresponding point-of-service logistical distance is a logistical distance within the shipping area structure that is defined by the destination location and the point-of-service location of the each production node, and
            identifying the production node based, at least in part, on the one or more production criteria, the corresponding point-of-service physical distances, and the corresponding point-of-service logistical distances, wherein
                the production node is identified such that the corresponding point-of-service logistical distance of the production node is less than the corresponding point-of-service logistical distance of any other production node of the plurality of production nodes; and
    communicating production information to the production node, wherein
        the production information is configured to facilitate production of the product by virtue of comprising
            information identifying the product,
            information identifying a first production system of the production node,
            information identifying a second production system of the production node,
            digital feature information, in a first digital format that is a pixel-oriented format, describing a feature of the product, and
            digital customization information, in a second digital format that is a vector-oriented format, describing a customization of the product,
        the computer system is configured to communicate with the each production node of the plurality of production nodes, and
        the communicating is configured to result in production of the product by the production node.

2. The method of claim 1, wherein
the production information comprises at least a portion of the product information,
the digital feature information is configured to cause the first production system to produce the feature of the product in a first media type of a plurality of media types, and
the digital customization information is configured to cause the second production system to produce the customization in a second media type of the plurality of media types.

3. The method of claim 1, wherein
the production information comprises
    first product information configured to facilitate production of a feature of the product, and
    second product information
        configured to effect one or more customizations of the product, and
the identifying is further based, at least in part, on the product,
the feature, and
the customization.

4. The method of claim 3, wherein the feature of the product is a reproduction of a handwritten sentiment.

5. The method of claim 3, wherein
the product information further comprises a product selection, and
the product selection identifies the product.

6. The method of claim 3, wherein
the first product information is configured to facilitate production of the feature of the product by virtue of comprising a feature selection that identifies the feature of the product.

7. The method of claim 3, further comprising:
receiving the production information at the production node; and
producing the product, wherein
the producing the product comprises
producing the feature of the product, and
customizing the product.

8. The method of claim 3, wherein
the production information is configured to
identify the product,
facilitate production of a feature of the product, and
facilitate production of one or more customizations for the product.

9. The method of claim 3, wherein
the second product information comprises feature information, and
the feature information identifies a feature of the product to be customized.

10. The method of claim 9, wherein
the second product information further comprises customization information, and
the customization information indicates a manner in which the feature should be customized during the production of the product.

11. The method of claim 1, wherein
each production node of the plurality of production nodes is situated in a corresponding one of a plurality of points-of-service.

12. The method of claim 11, wherein
the production node is selected based, at least in part, on a point-of-service of the plurality of points-of-service in which the production node is situated.

13. The method of claim 1, wherein
the product comprises a feature, and
the production node is configured to produce the product with the feature.

14. The method of claim 1, wherein
a shipping cost between the production node and the destination is equal to a shipping cost between at least one production node of the plurality of production nodes and the destination.

15. A distributed manufacturing system comprising:
one or more server systems, wherein
the one or more server systems comprise a communications server, and
the communications server comprises
one or more processors, and
a computer-readable storage medium, coupled to the one or more processors and in which are encoded
a product information processing module configured to obtain product information, wherein
the product information is configured to facilitate production of a product, and
the product is a greeting card,
a communications processing module configured to select a production node from a plurality of production nodes by virtue of being configured to
determine a destination physical location of a destination of the product, wherein
each production node of the plurality of production nodes is located at a corresponding point of service of a plurality of points of service,
determine a destination location within a shipping area structure, using the destination physical location, wherein
the shipping area structure is a hierarchical structure,
identify the production node, wherein the production node is identified by
determining one or more production criteria,
determining a point-of-service physical location for each point of service of the corresponding points of service,
determining a corresponding point-of-service physical distance for each production node of the plurality of production nodes, wherein
the corresponding point-of-service physical distance is defined by the destination physical location and the point-of-service physical location of the each production node,
determining a point-of-service location within the shipping area structure, using the point-of-service physical location,
determining a point-of-service location for the each point of service of the corresponding points of service, within the shipping area structure, wherein
the point-of-service location is determined using the point-of-service physical location of the each production node,
determining a corresponding point-of-service logistical distance for the each production node, wherein
the corresponding point-of-service logistical distance is a logistical distance within the shipping area structure that is defined by the destination location and the point-of-service location of the each production node, and
identifying the production node based, at least in part, on the one or more production criteria, the corresponding point-of-service physical distances, and the corresponding point-of-service logistical distances, wherein
the production node is identified such that the corresponding point-of-service logistical distance of the production node is less than the corresponding point-of-service logistical distance of any other production node of the plurality of production nodes, and
a communications module configured to communicate production information to the production node, wherein
the production information is configured to facilitate production of the product by virtue of comprising
information identifying the product, information identifying a first production system of the production node,
information identifying a second production system of the production node,
digital feature information, in a first digital format that is a pixel-oriented format, describing a feature of the product, and
digital customization information, in a second digital format that is a vector-oriented format, describing a customization of the product,
communication of the production information to the production node is configured to result in production of the product by the production node.

16. The distributed manufacturing system of claim 15, wherein
the digital feature information is configured to cause the first production system to produce the feature of the product in a first media type of a plurality of media types, and
the digital customization information is configured to cause the second production system to produce the customization in a second media type of the plurality of media types.

17. The distributed manufacturing system of claim 15, wherein the one or more server systems further comprises:
a production server, wherein
the production server is configured to produce the production information by integrating first product information and second product information,
the first product information is configured to facilitate production of a feature of the product, and
the second product information is configured to effect one or more customizations of the product,
the identifying is further based, at least in part, on
the product,
the feature, and
the customization.

18. The distributed manufacturing system of claim 17, wherein
the feature of the product is a reproduction of a handwritten sentiment.

19. The distributed manufacturing system of claim 17, wherein the second product information comprises:
feature information, wherein
the feature information identifies a feature of the product to be customized, and customization information, wherein
the customization information indicates a manner in which the feature should be customized during the production of the product.

20. The distributed manufacturing system of claim 19, wherein the one or more server systems further comprises:
a feature server, wherein
the feature server is configured to
receive the feature information, and
include the feature in the product.

21. The distributed manufacturing system of claim 19, wherein the one or more server systems further comprises:
a customization server, wherein
the customization server is configured to
receive the customization information, and
effect customization of the feature of the product to be customized.

22. A computer program product comprising:
a non-transitory computer-readable storage medium; and
a plurality of instructions encoded in the non-transitory computer-readable storage medium, comprising
a first set of instructions, executable by a computer system, configured to obtain product information, wherein
the product information is configured to facilitate production of a product, and
the product is a greeting card,
a second set of instructions, executable by the computer system, configured to select a production node from a plurality of production nodes, wherein
each production node of the plurality of production nodes is located at a corresponding point of service of a plurality of points of service,
the second set of instructions comprises
a first subset of instructions, executable by the computer system, configured to determine a destination physical location of a destination of the product,
a second subset of instructions, executable by the computer system, configured to determine a destination location within a shipping area structure, using the destination physical location, wherein
the shipping area structure is a hierarchical structure, and
a third subset of instructions, executable by the computer system, configured to identify the production node, and
the third subset of instructions are configured to identify the production node by
determining one or more production criteria,
determining a point-of-service physical location for each point of service of the corresponding points of service,
determining a corresponding point-of-service physical distance for each production node of the plurality of production nodes, wherein
the corresponding point-of-service physical distance is defined by the destination physical location and the point-of-service physical location of the each production node,
determining a point-of-service location for the each point of service of the corresponding points of service, within the shipping area structure, wherein
the point-of-service location is determined using the point-of-service physical location of the each production node,
determining a corresponding point-of-service logistical distance for the each production node, wherein
the corresponding point-of-service logistical distance is a logistical distance within the shipping area structure that is defined by the destination location and the point-of-service location of the each production node, and
identifying the production node based, at least in part, on the one or more production criteria, the corresponding point-of-service physical distances, and the corresponding point-of-service logistical distances, wherein
the production node is identified such that the corresponding point-of-service logistical distance of the production node is less than the corresponding point-of-service logistical distance of any other production node of the plurality of production nodes, and
a third set of instructions, executable by the computer system, configured to communicate production information to the production node, wherein the production information is configured to facilitate production of the product by virtue of comprising
information identifying the product,
information identifying a first production system of the production node,
information identifying a second production system of the production node,
digital feature information, in a first digital format that is a pixel-oriented format, describing a feature of the product, and
digital customization information, in a second digital format that is a vector-oriented format, describing a customization of the product,
the digital feature information is configured to cause the first production system to produce the feature of the product in a first media type of a plurality of media types,
the digital customization information is configured to cause the second production system to produce the customization in a second media type of the plurality of media types, and
the third set of instructions are configured to result in production of the product by the production node.

* * * * *